(12) United States Patent
Niibe et al.

(10) Patent No.: US 8,139,950 B2
(45) Date of Patent: Mar. 20, 2012

(54) PASSIVE OPTICAL NETWORK SYSTEM, OPTICAL LINE TERMINATOR AND, COMMUNICATION METHOD OF PASSIVE OPTICAL NETWORK SYSTEM

(75) Inventors: Masao Niibe, Yokohama (JP); Tohru Kazawa, Kokubunji (JP); Yusuke Yajima, Fujisawa (JP); Takeshi Kiyose, Fujisawa (JP); Masahiko Mizutani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 883 days.

(21) Appl. No.: 12/121,229

(22) Filed: May 15, 2008

(65) Prior Publication Data

US 2009/0202242 A1 Aug. 13, 2009

(30) Foreign Application Priority Data

Feb. 8, 2008 (JP) ................................. 2008-028987

(51) Int. Cl.
*H04B 10/00* (2006.01)
*H04J 14/00* (2006.01)
*H04J 4/00* (2006.01)
*H04J 14/08* (2006.01)

(52) U.S. Cl. .............. 398/168; 398/52; 398/53; 398/75; 398/98; 398/99; 398/100; 398/102

(58) Field of Classification Search .................. None
See application file for complete search history.

(56) References Cited

U.S. PATENT DOCUMENTS

| 7,272,315 | B1 * | 9/2007 | Au et al. ........................ 398/63 |
| 2002/0027695 | A1 * | 3/2002 | Kim et al. ..................... 359/189 |
| 2003/0020991 | A1 * | 1/2003 | Chang ............................ 359/168 |
| 2003/0035173 | A1 * | 2/2003 | Byers et al. ................... 359/135 |
| 2007/0064731 | A1 * | 3/2007 | Mizutani et al. .............. 370/468 |
| 2008/0181613 | A1 * | 7/2008 | Bouda ............................ 398/98 |

OTHER PUBLICATIONS

Series G: Transmission Systems and Media, Digital Systems and Networks, G.984.3, Feb. 2004.
Series G: Transmission Systems and Media, Digital Systems and Networks, G.984.1, Mar. 2003.
Series G: Transmission Systems and Media, Digital Systems and Networks, G.984.2, Mar. 2003.

* cited by examiner

*Primary Examiner* — Kenneth N Vanderpuye
*Assistant Examiner* — Darren E. Wolf
(74) *Attorney, Agent, or Firm* — Brundidge & Stanger, P.C.

(57) ABSTRACT

A passive optical network system (PON) has a plurality of OLTs and ONUs with different transmission rates. OLTs with different transmission rates share information of priority frames and destinations, and determine timing for frame transmission to ONUs so that the signal from each of the OLTs does not collide when multiplied in a splitter. OLTs transmit the data to the ONU as a burst signal to prevent the signals with different rates from colliding. ONU acquires the information of the following burst frames. ONU receives only the signal addressed to the own ONU or with the transmission rate of own ONU, therefore errors in ONUs can be avoided. OLT receives only the signal with the transmission rate of own OLT from ONUs based on the transmission timing from the ONUs shared by the line terminators, errors in OLTs can be avoided.

11 Claims, 14 Drawing Sheets

DOWNSTREAM BW MAP

| ONU NUMBER | Start | End | Signal | NOTE | |
|---|---|---|---|---|---|
| No.1 | #33 | 10 | 50 | 10G | 10G PRIORITY 1 |
| No.2 | #1 | 60 | 100 | 1G | 1G PRIORITY 1 |
| No.3 | #34 | 110 | 150 | 10G | 10G PRIORITY 2 |
| No.4 | #2 | 160 | 200 | 1G | 1G PRIORITY 2 |
| ... | ... | ... | ... | ... | ... |
| No.x-2 | #y | 240 | 280 | 1G | 1G PRIORITY z |
| No.x-1 | #33 | 810 | 850 | 10G | 10G PRIORITY 1 |
| No.x | #1 | 860 | 900 | 1G | 1G PRIORITY 1 |

Rows No.1–No.4: DOWNSTREAM BW MAP OF CONTINUOUS BURST FRAME

Rows No.x-2–No.x: DOWNSTREAM BW MAP OF FIRST STAGE OF EACH TRANSMISSION RATE OF SUBSEQUENT CONTINUOUS BURST FRAME

PASSIVE OPTICAL NETWORK SYSTEM, OPTICAL LINE TERMINATOR AND, COMMUNICATION METHOD OF PASSIVE OPTICAL NETWORK SYSTEM

BACKGROUND OF THE INVENTION

1. Field of the Invention

The present invention relates to a passive optical network system, an optical line terminator, and a communication method of a passive optical network system, and in particular to a passive optical network system provided with two or more optical line terminators communicating at different transmission rates in passive optical network systems in which two or more subscriber connection devices have an optical transmission line in common, the optical line terminator in such a passive optical network system, and a communication method of such a passive optical network system.

2. Description of the Related Art

In order for transmitting and receiving large volumes of image signals or data via a communication network, shifting to high-speed and broadband communication network has been promoted also in the access network for connecting the subscribers to the communication network, and introduction of the passive optical network system (hereinafter referred to as a PON) defined by the Recommendations G.984.1 through G.984.3 of International Telecommunication Union Telecommunication Standardization Sector (hereinafter referred to as ITU-T) has been attempted. The PON is a system composed of an optical line terminator (hereinafter referred to as an OLT) to be connected to a host communication network and two or more optical network units (each hereinafter referred to as an ONU) accommodating subscriber terminals (e.g., PCs or phones) connected via a passive optical network including a backbone optical fiber, an optical splitter, and a plurality of feeder optical fibers. Specifically, the PON performs communication in a form of transmitting signal from the terminal (e.g., a PC) connected to each of the ONUs to the OLT as an optical signal with the backbone optical fiber from the feeder optical fiber via the optical splitter while optically (time-division) multiplexing the signal, and the OLT executing a communication process on the signal from each of the ONUs and then transmitting the result to the host communication network or to another ONU connected to the OLT.

Development and introduction of the PON started from a system handling a low-speed signal of 64 Kbit/sec, and introduction of a broadband PON (BPON) transmitting and receiving a fixed-length ATM cell at a maximum rate of about 600 Mbit/sec, Ethernet PON (EPON) transmitting and receiving a variable-length packet of Ethernet at a maximum rate of about 1 Gbit/sec, or a gigabit PON (GPON) standardized by the ITU-T Recommendations G.984.1, G.984.2, and G.984.3 handling a higher-speed signal of about 2.4 Gbit/sec is promoted. Further, now realization of a high-speed PON capable of handling a signal at a rate in a range of 10 Gbit/sec through 40 Gbit/sec is expected. As a measure for realizing such high-speed PONs, there are studied multiplexing methods such as time division multiplexing (TDM) of a number of signals, wavelength division multiplexing (WDM) thereof, or code division multiplexing (CDM) thereof. It should be noted that current PONs adopt the TDM, and the GPON, for example, has a configuration of using different wavelengths between an upstream (from the ONU to the OLT) signal and a downstream (from the OLT to the ONU) signal, and assigning a communication time period of the signal to each of the ONUs in the communication between the OLT and each of the ONUs. Further, the past configuration of processing fixed-length signals is shifting to the configuration of additionally processing burst variable-length signals (burst signals) with which further various types of signals (e.g., sounds, images, and data) can easily be handled. Regarding the high-speed PON in the future, there are studied various multiplexing methods as described above, and the study of applying the TDM is becoming mainstream.

In the form of each of the PONs described above, since the ONUs are implemented in subscriber's houses scattered about various locations, the distances between the OLT and the ONUs are different from each other. Specifically, since the length of the optical fiber (the transmission distance) obtained by adding the backbone optical fiber from the OLT to each of the ONUs and the feeder optical fiber with each other varies, transmission delay between each of the ONUs and the OLT varies, thus there is a possibility that the signals transmitted from the respective ONUs collide and interfere with each other on the backbone optical fiber. Therefore, in each of the PONs, it is arranged that the delay in the output signal of each of the ONUs is adjusted so that the signal outputs from the respective ONUs do not collide with each other after performing measurement of the distance between the OLT and the ONU using a technology called ranging as defined in, for example, chapter 10 of the G.984.3.

Further, it is also arranged that when deciding the signal band allowed for each of the ONUs to transmit based on the transmission request from the ONU using a technology called dynamic bandwidth assignment (hereinafter referred to as DBA), the OLT designates the transmission timing to each of the ONUs so that the signals from the respective ONUs do not collide or interfere with each other in consideration of the amount of delay measured by the ranging described above. In other words, the PON is configured so that the operation of the communication is performed in the condition in which the timing of the signals transmitted and received between the OLT and each of the ONUs is controlled in the system.

According, for example, to the provision of chapter 8.3.3 of G.984.2, in the transmission and reception of the signals between the OLT and each of the ONUs, a guard time composed maximum of 12 bytes for preventing interference, a preamble used for determining a signal discrimination threshold of a receiver in the OLT and clock extraction, burst overhead bytes called a delimiter for discriminating a break of the received signal, and a control signal for the PON (also referred to as an overhead or a header in some cases) added to the data (also referred to as a payload in some cases) at the head of the signal from each of the ONU so that the OLT can distinguish and process the signal from each of the ONUs multiplexed in the backbone optical fiber. It should be noted that since each data (payload) is variable-length burst data, a header called a G-PON encapsulation method (GEM) header for processing the variable-length data is also added to each data at the head thereof.

Further, in the signal from the OLT to each of the ONUs, a frame synchronization pattern for discriminating the head, a PLOAM field for transmitting monitoring information, maintenance information, and control information, and an overhead (also referred to as a header in some cases) called a grant field for designating the signal transmission timing of each of the ONTs are added to the data time-division multiplexed to each of the ONU at the head of the signal transmitted from the OLT to each of the ONU so that each of the ONUs can discriminate and process the signal from the OLT. It should be noted that the GEM header for processing variable-length data is added to the multiplexed data to each of the ONUs similarly to the signal from the ONU. The OLT designates the upstream transmission grant timing (start and stop of transmission) of each of the ONUs to each of the ONUs by byte using the grant field. The transmission grant timing is called a grant. Further, when each of the ONUs transmits data to the OLT with the grant timing, the data is optically (time-division) multiplexed on the optical fiber, and then received in the OLT.

SUMMARY OF THE INVENTION

In the PON, the signals from the OLT to the two or more ONUs are time-division multiplexed and then transmitted to all of the ONUs. In other words, even in the case in which the signal band (amount of signals) provided to the ONU is small, each of the ONUs once receives all of the communication signals from the OLT to each of the ONUs, discriminates the communication content addressed to the own ONU using the header (specifically, PORT ID in the GEM header in the case with GPON, or an identifier of the ONU called LL ID in the case with EPON), and takes only the discriminated signals inside the ONU to transmit it to the subscriber (user). As described above, the development and introduction of the PON have been advanced from those processing low-speed signals to those processing higher-speed signals as the transition from the BPON to the GPON. However, as the case now stands, standardization of each of the PONs is proceeding to be fixed not in a form having complete compatibility in the transmission rate of signals, interaction of control signals, and the protocol although some consideration is given to absorbing older PONs, but in a form different for every PON. Therefore, in the case in which the necessity for supporting a higher transmission rate than the transmission rate supported by the related art arises in the ONU in accordance with expansion of the volume of communication services, the system in the related art is required to adopt (replace with) a new PON having an expanded overall PON transmission rate such that the BPON is replaced with the GPON. In other words, it is required to replace the OLT and all of the ONUs connected to the OLT with new facilities in accordance with the PON with newly expanded transmission capacity.

In consideration of introduction of the PON and the form of use, it is conceivable that although needs for providing service capacity at a higher speed increase, all of the needs are not instantaneously replaced, but such use starts in some users and increases gradually, and in this period there exist many subscribers satisfied with the existing PON. Replacement of the existing PON with a new PON means replacement of all of the OLTs and the ONUs, which requires a huge expense for the replacement. Further, in consideration of the reality of expansion of communication service capacity, replacement with facilities not yet necessary for some users should be performed, which could lead to a relatively high burden of expense for the carrier introducing the PON or the user of the PON. Therefore, the PON having a configuration capable of interconnecting PON facilities having different transmission rates, capable of transition to a new PON while accommodating the existing PON facilities, and capable of being operated in the condition in which two or more PONs different in specification or performance from each other are mixed, and the communication method thereof are required.

In view of the above point, the present invention has an object of providing a passive optical network system an optical line terminator and a communication method of the passive optical network system. The passive optical network system has a configuration capable of operating two or more PONs with specifications (standards) different from each other, an optical line terminator, and a communication method of the passive optical network system. More specifically, one of the objects of the present invention is to provide a passive optical network system equipped with OLTs and ONUs and having a configuration capable of accommodating and operating a plurality of OLTs and a plurality of ONUs having transmission rates different from each other in a mixed manner in a PON performing communication of a signal between each of the OLTs and each of the ONUs having transmission rates different from each other in a time-division multiplexing manner. Further, one of the objects of the present invention is to provide a system and so on capable of coping with occurrence of a request for increase in communication service capacity by replacing only the relevant OLT and ONU, thereby suppressing the expense for replacing the communication devices.

The signals transmitted and received between each of the OLTs and each of the ONUs in the PON each include the overhead (the header) for performing setting and control of the system by communicating the control signals and the protocol described above, and the signal (e.g., data, image signal, and sound signal, hereinafter collectively referred to simply as data in some cases) transmitted and received by the user of the PON via the OLTs and the ONUs. Among the above, the header (several tens bytes) is added to the data transmitted and received by the user every frame of 125 μs period, and the control signal itself included in the header is transmitted and received every several frames, processed inside the OLT or the ONU, and then used for setting or control of the PON.

The PON is arranged to be operated in the condition in which the transmission and reception timing of a signal is controlled based on the technology such as the ranging or the DBA described above. Therefore, even if data of two or more rates are mixed, it is possible to figure out the positions (the transmission and reception timing) thereof for processing.

The present invention has been made focusing attention to the characteristics of the PON described above, and in order for solving the above problem, when two or more OLTs with specifications (standards) different from each other and having the transmission path in common transmit the frame to each of the ONUs corresponding to the respective transmission rates, the OLTs determine the timing of transmission based on the information the OLTs have in common. Further, from the configuration for transmitting continuous frames as in the related art, a burst signal, which is similar to a signal transmitted by each of the ONUs and the OLT based on the grant when a frame is transmitted from each of the ONUs to the OLT in the PON in the related art, and has a constant interval (the guard time) between each of the frames based on the timing allocated to each of the OLTs, is transmitted. According to these configurations, the frames transmitted from the respective OLTs can be prevented from colliding with each other. Further, the timing information is loaded on the header of the frame received by each of the ONUs, thus notifying each of the ONUs of the timing information, and each of the ONUs performs receiving operation every timing the frame with the corresponding transmission rate arrives or every timing addressed to own ONU based on the notification. According to this configuration, each of the ONUs can receive the target frame without detecting an error.

Further, when transmitting the frame from each of the ONUs to each of the OLTs, instead of each ONUs determining the transmission timing (the grant) in one OLT as in the related art, each of the OLT is made determine the grant taking the frames from the ONUs having different transmission rates into consideration. According to this configuration, even in the frame transmission from each of the ONUs to each of the OLTs, collisions therebetween can be prevented.

According to the first solving means of this invention, there is provided a passive optical network system, comprising:

a first master station for communicating at a first transmission rate;

a second master station for communicating at a second transmission rate different from the first transmission rate;

a first slave station for communicating with the first master station at the first transmission rate;

a second slave station for communicating with the second master station at the second transmission rate; and an optical fiber network having a first splitter and a second splitter, frames from the first master station and the second master station being time-division multiplexed via the first splitter, and the multiplexed frames being transmitted to the first and second slave stations via the second splitter, wherein the first master station and/or the second master station include(s)

queues corresponding to previously determined priority, and for storing data to be transmitted to one of the first and second slave stations, a queue sorting watching section for obtaining priority information of the queues of the own master station, and obtaining priority information of the queues from the other master station, an adjustment section for determining transmission timing of the frames transmitted from the first and second master stations based on the priority information of the queues of the own master station and the priority information of the queues of the other master station obtained by the queue sorting watching section and priority instruction information of the master stations previously defining which of the own master station and the other master station has priority, so that the frame from the first master station and the frame from the second master station do not collide with each other in the optical fiber network, and a transmission section for retrieving the data stored in the queues to form a frame, and transmitting the frame to the first and second slave stations via the optical fiber network according to the transmission timing determined by the adjustment section.

According to the second solving means of this invention, there is provided a passive optical network system, comprising:

a first master station for communicating at a first transmission rate;

a second master station for communicating at a second transmission rate different from the first transmission rate;

a first slave station having a first queue and for communicating with the first master station at the first transmission rate;

a second slave station having a second queue and for communicating with the second master station at the second transmission rate;

an optical fiber network having a first splitter and a second splitter, frames from the first slave station and the second slave station being time-division multiplexed via the second splitter, and the multiplexed frames being transmitted to the first and second master stations via the first splitter, wherein the first master station and/or the second master station include(s)

a grant designation generation section for obtaining first queue length information representing an amount of data stored in one of the first and second queues from one of the first and second slave stations, obtaining, from the other master station, second queue length information which represents an amount of data stored in the other of the first and second queues and is obtained by the other master station from the other of the first and second slave stations, determining, based on the first and second queue length information, transmission timing with which each of the first and second slave stations transmits a frame and, creating a grant designation including the determined transmission timing of each slave stations, and a transmission section for transmitting the created grant designation to the first and second slave stations, and further wherein, the first and second slave stations transmit the frame according to the transmission timing for the own station included in the grant designation.

According to the third solving means of this invention, there is provided an optical line terminator used in a passive optical network system including a plurality of optical line terminators communicating at different transmission rates, a first optical network unit for communicating with one of the optical line terminators at a first transmission rate, a second optical network unit for communicating with another of the optical line terminators at a second transmission rate, an optical fiber network having a first splitter and a second splitter, frames from the plurality of optical line terminators being time-division multiplexed via the first splitter, and the multiplexed frames being transmitted to the first and second optical network units via the second splitter, the optical line terminator comprising:

queues corresponding to previously determined priority, and for storing data to be transmitted to one of the first and second optical network units;

a queue sorting watching section for obtaining priority information of the queues of the own optical line terminator, and obtaining priority information of the queues from another optical line terminator;

an adjustment section for determining transmission timing of the frames transmitted from the plurality of optical line terminators based on the priority information of the queues of the own optical line terminator and the priority information of the queues of another optical line terminator obtained by the queue sorting watching section and priority instruction information of the optical line terminators previously defining which of the own optical line terminator and another optical line terminator has priority, so that the frames from the plurality of optical line terminators do not collide with each other in the optical fiber network; and a transmission section for retrieving the data stored in the queues to form a frame, and transmitting the frame to the first and second optical network units via the optical fiber network according to the transmission timing determined by the adjustment section.

According to the fourth solving means of this invention, there is provided an optical line terminator used in a passive optical network system which includes a plurality of optical line terminators communicating at different transmission rates, a first optical network unit for communicating with one of the optical line terminators at a first transmission rate, a second optical network unit for communicating with another of the optical line terminators at a second transmission rate, an optical fiber network having a first splitter and a second splitter, frames from the first and second optical network units being time-division multiplexed via the second splitter, and the multiplexed frame being transmitted to the plurality of optical line terminators via the first splitter and, in which the first and second optical network units transmit the frame according to the transmission timing for the own device included in the grant designation received from the optical line terminator, the optical line terminator comprising:

a grant designation generation section for obtaining first queue length information representing an amount of data stored in one of first and second queues from one of the first and second optical network units, obtaining, from the other optical line terminator, second queue length information which represents an amount of data stored in the other of the first and second queues and is obtained by the other optical line terminator from the other of the first and second optical network units, determining, based on the first and second queue length information, transmission timing with which each of the first and second optical network units transmits a frame and, creating a grant designation including the determined transmission timing of each optical network units; and a transmission section for transmitting the created grant designation to the first and second optical network units.

According to the fifth solving means of this invention, there is provided a communication method between a plurality of master stations and a plurality of slave stations of a passive optical network system in which the plurality of master stations and the plurality of slave stations are connected with an optical fiber network including an optical splitter, the communication method comprising:

a step in which the plurality of master stations shares priority information of a plurality of queues in each of the master stations;

a step in which the plurality of master stations determines transmission timing of the frame to the plurality of slave stations based on priority instruction information representing which of the master stations has priority and the priority information shared by the master stations; and a step in which the plurality of master stations transmits a plurality of frames as a burst signal having guard time between the frames according to the transmission timing.

According to the sixth solving means of this invention, there is provided a communication method between a plurality of master stations and a plurality of slave stations of a passive optical network system in which the plurality of master stations and the plurality of slave stations are connected with an optical fiber network including an optical splitter, the communication method comprising the steps of:

a step in which the plurality of master stations shares queue length information representing an amount of data stored in queues provided to the plurality of slave stations;

a step in which the plurality of master stations determines the transmission timing of the frame transmitted from the plurality of slave stations based on the queue information shared by the master stations and, creates a grant designation including the determined transmission timing and transmission rate information of the frame transmitted with the transmission timing;

a step in which the plurality of master stations transmits the created grant designation to the plurality of slave stations; and a step in which the plurality of slave stations transmits the frame according to the transmission timing included in the grant designation.

According to the present invention, it is possible to provide a passive optical network system an optical line terminator and a communication method of the passive optical network system. The passive optical network system has a configuration capable of operating two or more PONs with specifications (standards) different from each other, an optical line terminator, and a communication method of the passive optical network system. More specifically, according to the present invention, it is possible to provide a passive optical network system equipped with OLTs and ONUs and having a configuration capable of accommodating and operating a plurality of OLTs and a plurality of ONUs having transmission rates different from each other in a mixed manner in a PON performing communication of a signal between each of the OLTs and each of the ONUs having transmission rates different from each other in a time-division multiplexing manner. Further, according to the present invention, it is possible to provide a system and so on capable of coping with occurrence of a request for increase in communication service capacity by replacing only the relevant OLT and ONU, thereby suppressing the expense for replacing the communication devices.

BRIEF DESCRIPTION OF THE DRAWINGS

FIG. 10 is a table configuration diagram showing a configuration example of a downstream BW map.

DESCRIPTION OF THE PREFERRED EMBODIMENTS OF THE INVENTION

Hereinafter, a configuration and an operation of PONs in the present embodiment will be explained in detail with reference to the drawings exemplifying a configuration and an operation of PONs including a GPON compliant to ITU-T Recommendations G.984 series and 10 GPON expected to be introduced in the future as a next-generation GPON having an increased transmission rate in a mixed manner.

Figure 3:
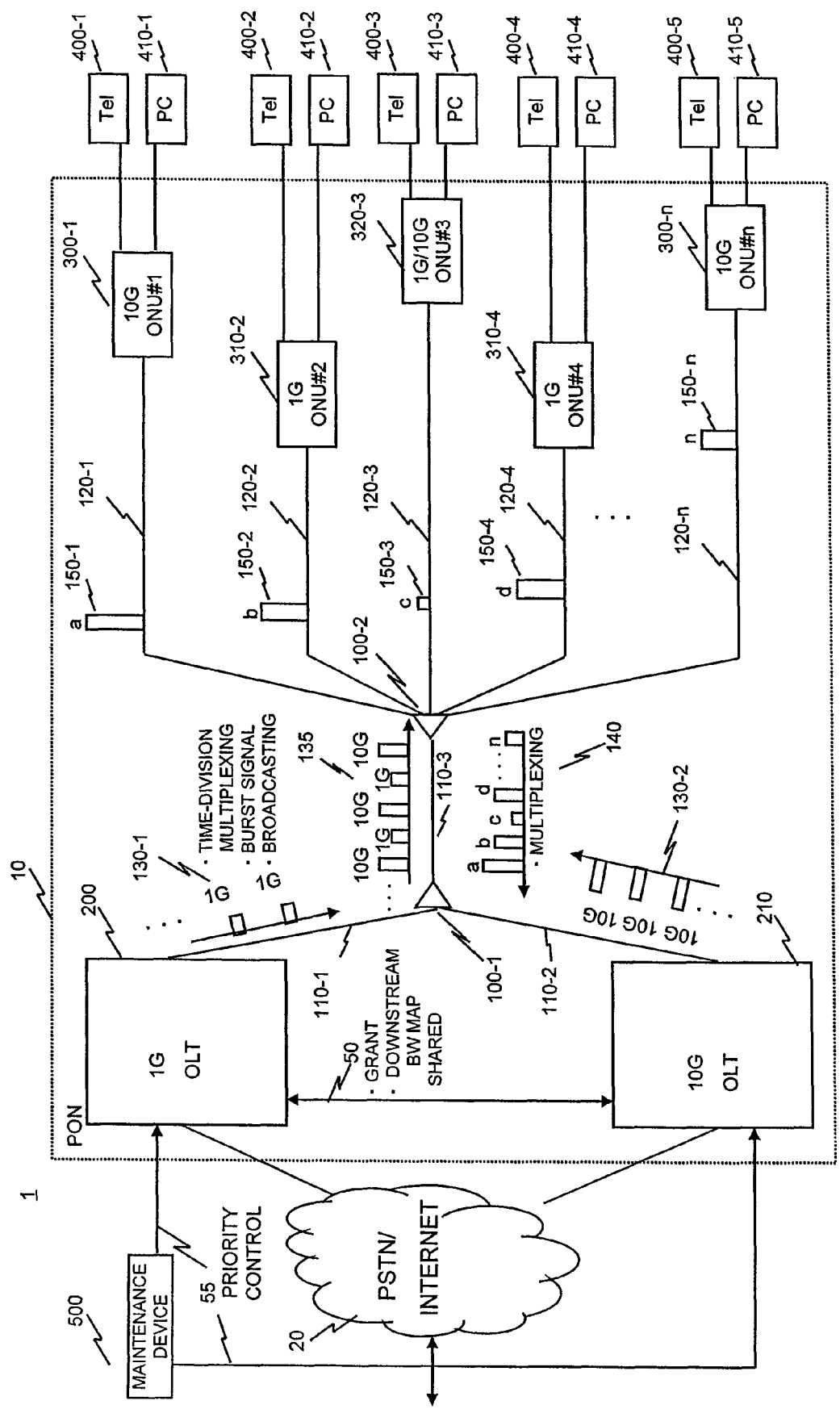
FIG. 3 is a network configuration diagram showing a configuration example of an optical access network using a PON.

In the following descriptions, the PONs are assumed to have configurations for processing variable-length data in a time-division multiplexing manner similarly to the GPON, and the explanations will be presented exemplifying the GPON with a data transmission rate from an OLT to an ONU of 1 Gbit/sec (specifically 1.24416 Gbit/sec, hereinafter referred to simply as 1 Gbit/sec) and the 10 GPON with a data transmission rate from an OLT to an ONU of 10 Gbit/sec (specifically 9.95328 Gbit/sec, hereinafter referred to simply as 10 Gbit/sec). Further, the explanations will be presented exemplifying the GPON with the transmission rate of upstream data from the ONU to the OLT of 1 Gbit/sec (specifically 1.24416 Gbit/sec, hereinafter similarly referred to simply as 1 Gbit/sec) and the 10 GPON with a data transmission rate of upstream data from the ONU to the OLT of 5 Gbit/sec (specifically 4.97664 Gbit/sec, hereinafter similarly referred to simply as 5 Gbit/sec). It should be noted that these numerical values of the transmission rates are mere examples, and the present embodiment is not limited to these values.
Overall Configuration FIG. 3 is a network configuration diagram showing a configuration example of an optical access network using a PON.

The access network 1 is a network for connecting a public switched telephone network (PSTN)/the Internet 20 (hereinafter referred to as a host network in some cases) as a host communication network and terminals of subscribers (e.g., Tel 400, PC 410) via the PON 10 to perform communication.

The PON 10 is equipped with a plurality of OLTs (hereinafter referred to as master stations or main stations in some cases) 200 and 210 connected to the host network 20, and a plurality of ONUs (hereinafter referred to as slave stations or substations in some cases) 300, 310, and 320 accommodating the terminals (e.g., telephone (Tel) 400, and PC 410) of the subscribers. Further, the OLT 200, 210 and each of the ONUs 300, 310, and 320 are connected via a passive optical network including a plurality of backbone optical fibers 110, optical splitters 100 and a plurality of feeder optical fibers 120 to perform communication between the host network 20 and the subscriber terminals 400, 410, or communication among the subscriber terminals 400, 410.

The ONU 300 is, for example, an ONU for the 10 GPON (with a downstream rate of 10 Gbit/sec), the ONU 310 is, for example, an ONU for the GPON (with a downstream rate of 1 Gbit/sec), and the ONU 320 is, for example, an ONU (capable of performing the reception at downstream rates of both 1 Gbit/sec and 10 Gbit/sec) for both of the 10 GPON and the GPON. Even in the case in which the three types of ONUs exist in a mixed manner, according to the current Recommendations G.984 series, the maximum of 64 corresponding ONUs can be connected to each of the OLTs 200, 210. In the example shown in FIG. 3, there are shown five ONUs 300, 310, and 320, 10 Gbit/sec ONU#1 and ONU#n (300-1, 300-n) capable of receiving data at a downstream transmission rate of 10 Gbit/sec, 1 Gbit/sec ONU#2 and ONU#4 (310-2, 310-4) capable of receiving data at a downstream transmission rate of 1 Gbit/sec, 1 G/10 G bit/sec ONU#3 (320-3) capable of receiving data at both downstream transmission rates of 1 Gbit/sec and 10 Gbit/sec are connected to the OLT 200 and the OLT 210 in a mixed manner.

Although described later in detail, in a downstream signal 135 transmitted in a direction from the OLTs 200 and 210 towards the ONUs 300, 310, and 320, signals addressed to the respective ONUs 300, 310, and 320 are time-division multiplexed and broadcasted as burst data. For example, a burst signal 130-1 of 1 Gbit/sec transmitted from the OLT 200 and a burst signal 130-2 of 10 Gbit/sec transmitted from the OLT 210 are multiplexed by the optical splitter 100-1 to form the signal 135, and then separated by the optical splitter 100-2 to be broadcasted to the respective ONUs. In each of the ONUs 300, 310, and 320, whether or not the frame to be arrived following the signal received by each of the ONUs 300, 310, and 320 has the own transmission rate is not only judged, but also whether or not it is a signal addressed to itself is judged, and the signal is transmitted to the telephone 400 or the PC 410 in accordance with the destination of the signal.

Further, in the direction from the ONUs 300, 310, and 320 towards the OLTs 200, 210, an upstream signal 150-1 transmitted from the ONU 300-1, an upstream signal 150-2 transmitted from the ONU 310-2, an upstream signal 150-3 transmitted from the ONU 320-3, an upstream signal 150-4 transmitted from the ONU 310-4, and a signal 150-n transmitted from the ONU 300-n form an optical multiplexed signal 140 optically time-division multiplexed via the optical splitter 100-2, and are broadcasted to the OLTs 200, 210 via the optical splitter 100-1. It should be noted that since the lengths of the fibers between the ONUs and the OLTs 200, 210 are different from each other, the signal 140 has a form of multiplexing signals different in amplitude.

It should be noted that an optical signal with a wavelength band of 1.5 μm, for example, is used as the downstream signal 135 while an optical signal with a wavelength band of 1.3 μm, for example, is used as the upstream signal 140, 150, and the both optical signals are wavelength-division multiplexed (WDM) to be transmitted and received via the optical fibers 110, 120.

Figure 4:
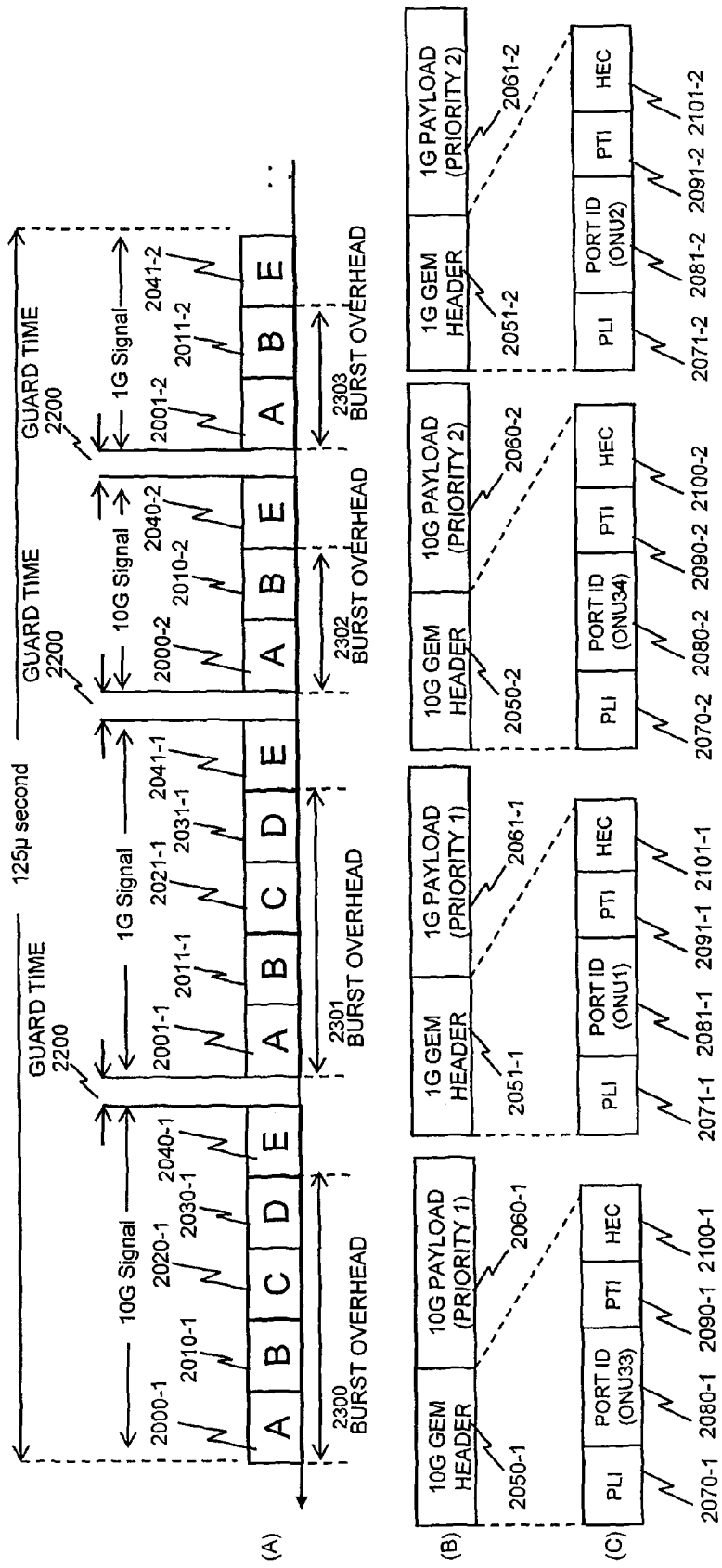
FIG. 4 is a signal configuration diagram showing a configuration example of an optical signal from an OLT to an ONU.
Figure 5:
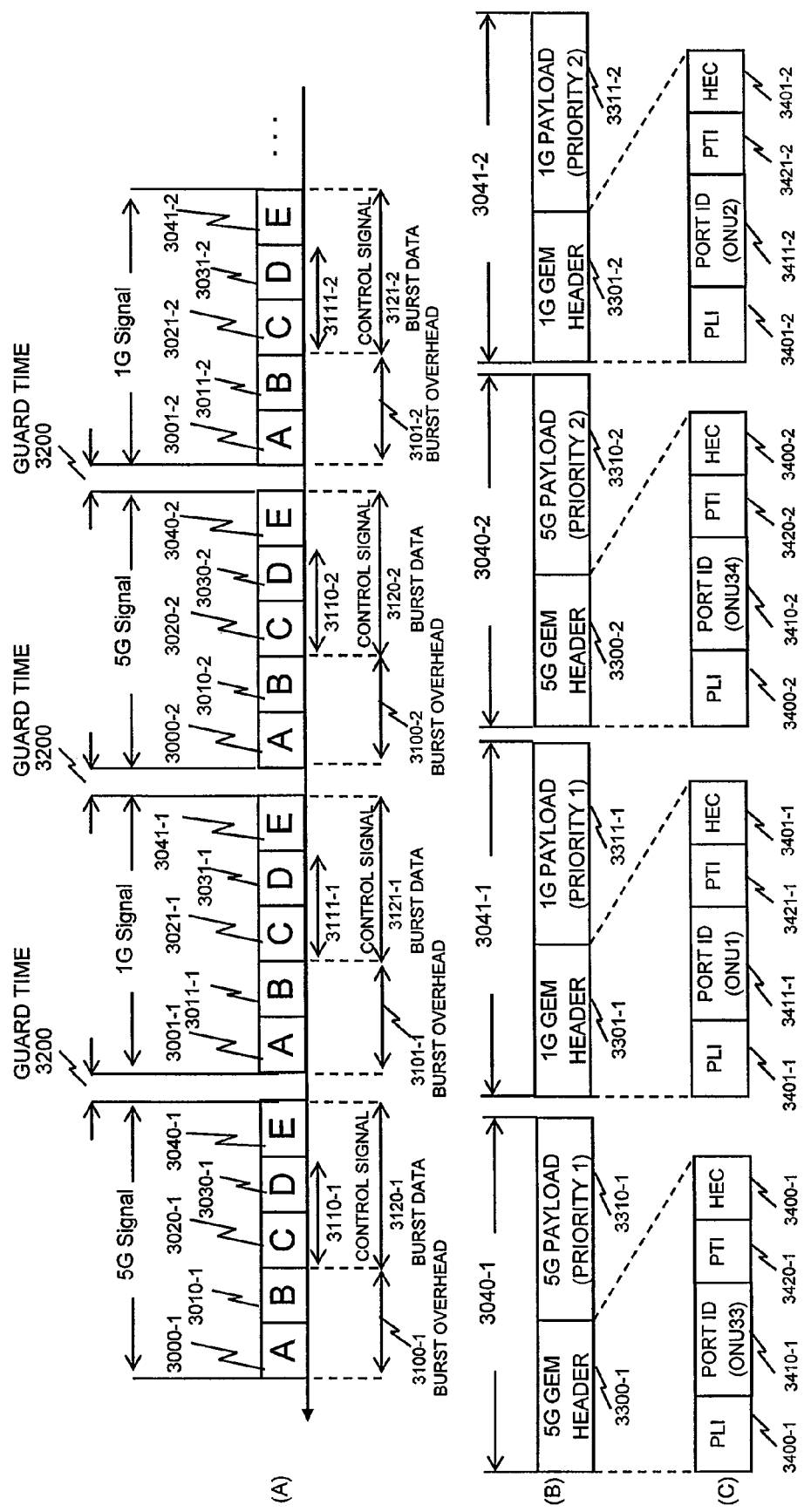
FIG. 5 is a signal configuration diagram showing a configuration example of an optical signal from an ONU to an OLT.

The OLT 200 and the OLT 210 are capable of communicating with each other, and have queue information of each of the OLTs, the downstream BW map thus created, queue information of each of the ONUs each of the OLTs has received from each of the ONUs, the grant designation thus created, and so on in common.
Signal Configuration FIG. 4 is a signal configuration diagram showing a configuration example of an optical signal from the OLT to the ONU. FIG. 5 is a signal configuration diagram showing a configuration example of an optical signal from the ONU to the OLT.

Although the configuration of the optical signal of the 10 GPON is currently not defined, since both of the GPON and the 10 GPON are for handling variable-length data, it is conceivable that the signal at each transmission rate is realistically (practicably) processed by time-division multiplexing with a similar signal configuration to the GPON defined by the current Recommendation. Therefore, in the present embodiment, the explanation of the operation of the PON will be presented based on the signal configuration defined in the GPON. It is obvious that the signal configuration and the operation of the PON are mere examples, the present embodiment is not limited to the configuration and the operation. Further, it is assumed here that the ONU 320 operates as an ONU for the 10 GPON.

The signal from the OLTs 200, 210 to each of the ONUs 300, 310, and 320 is called a downstream signal 135, and is a burst signal having a pattern of 125 μs and including guard time 2200, which is a signal-less (an OFF state of the optical signal) field for separating the transmission signals between the OLTs or inside the OLT, as shown in the part (A) of FIG. 4. There are included burst overhead 2302, 2303 including frame sync patterns (A) 2000, 2001 for allowing each of the ONUs 300, 310, and 320 to find out the beginning of the signal and PLOAM field (B) 2010, 2011 for transmitting information regarding watching, maintenance, and control to each of the ONUs 300, 310, and 320, and burst frame payload (E) 2040, 2041 having the data to the ONUs 300, 310, 320 time-division multiplexed. It should be noted that in the burst frame of the first stage of each of the transmission rates, a grant designation field (C) 2020, 2021 for designating the transmission timing of the upstream signal from each of the ONUs 300, 310, 320 to the OLT 200, 210 and the downstream BW map (D) 2030, 2031 for storing the timing information of the subsequent burst frame are further provided to the burst overhead 2300, 2301. This signal 135 is broadcasted to the ONUs 300, 310, and 320. Each of the ONUs 300, 310, and 320 judges the arrival timing of the signal to be received and whether or not the signal to be received is a signal addressed to the own ONU based on the burst overhead, and performs various operations corresponding to the burst overhead 2300, 2301 explained below and transmission of the received data to the destination terminals 400, 410.

The part (B) of FIG. 4 is a configuration diagram showing a detailed configuration of the frame payload 2040, 2041. The data addressed to the respective ONUs 300, 310, and 320 (10 G payload 2060 and 1 G payload 2061) is time-division multiplexed inside the frame payload 2040, 2041. Further, GEM headers (the GEM header 2050 for 10 Gbit/sec and the GEM header 2051 for 1 Gbit/sec) used for data reception in each of the ONUs such as a data identifier for each of the ONUs are added. The part (C) of the drawing is a configuration diagram showing the configuration of the GEM header 2050, 2051. The details of each of the bytes are defined in the Recommendations of G.984 series, and the explanations therefor will be omitted.

On the other hand, signals from each of the ONUs 300, 310, and 320 to the OLTs 200, 210 are called upstream signals 150. As shown in the part (A) of FIG. 5, the upstream signal 150 includes burst data 3120, 3121 and burst overhead 3100, 3101. The burst data 3120, 3121 includes a control signal 3110, 3111 and variable-length frame payload (E) 3040, 3041 containing the data from the terminals 400, 410 of the present ONU. The a control signal 3110, 3111 includes the PLOAM field (C) 3020, 3021 for transmitting information regarding watching, maintenance, and control of each of the ONUs 300, 310, and 320 and, a queue length field (D) 3030, 3031 for notifying the OLTs 200, 210 of an amount of data each of the ONUs 300, 310, and 320 is waiting for sending. The burst overhead 3100, 3101 includes a preamble (A) 3000, 3001 and a delimiter (B) 3010, 3011 for allowing each of the OLTs 200, 210 to recognize and process the burst data 3120, 3121 from each of the ONUs 300, 310, and 320. It should be noted that the guard time 3200 shown before the preamble 3000, 3001 is a signal-less (the OFF state of the optical signal) field for separating the signal transmitted from each of the ONUs, and the total size of the guard time 3200 and the burst overhead 3100, 3101 is defined as a maximum of 12 bytes in the Recommendations of G.984 series. As shown in FIG. 3, the upstream signals from the respective ONUs 300, 310, and 320 are time-division multiplexed on the backbone optical fiber 110-3 after passing through the optical splitter 100-2 to be formed as the multiplex optical signal 140, and broadcasted to the OLTs 200, 210 via the optical splitter 100-1.

The part (B) of FIG. 5 is a configuration diagram showing a detailed configuration of the frame payload 3040, 3041. The data (1 G payload 3311 and 5 G payload 3310) from the respective ONUs 300, 310, and 320 are time-division multiplexed inside the frame payload 3040, 3041 with the GEM header 3300, 3301 used for data reception in the OLTs 200, 210 such as the data identifier for every ONU similarly to the downstream signal. The part (C) of the drawing is a configuration diagram showing the configuration of the GEM header 3300, 3301. The details of each of the bytes are defined in the Recommendations of G.984 series, and the explanations therefor will be omitted.

Regarding the transmission timing of the upstream signal 150 from each of the ONUs 300, 310, and 320, although described later in detail with reference to FIG. 9, for example, the control parameter necessary for the system operation called ranging is firstly set to each of the OLTs 200, 210 and each of the ONUs 300, 310, and 320 at the start-up of the PON system, and then the OLTs 200, 210 have a queue length report received from each of the ONUs 300, 310, and 320 in common. An amount of data (the band) allowed to be transmitted from each of the ONUs is determined based on the allowable traffic in accordance with a contract, and the transmission enabling timing (grant) corresponding to the determined band is notified to each of the ONUs 300, 310, and 320 with the grant designation field 2020, 2021. Each of the ONUs 300, 310, and 320 transmits the upstream signal 150 towards the OLTs 200, 210 with the timing granted to the own ONU.

OLT

Figure 6:
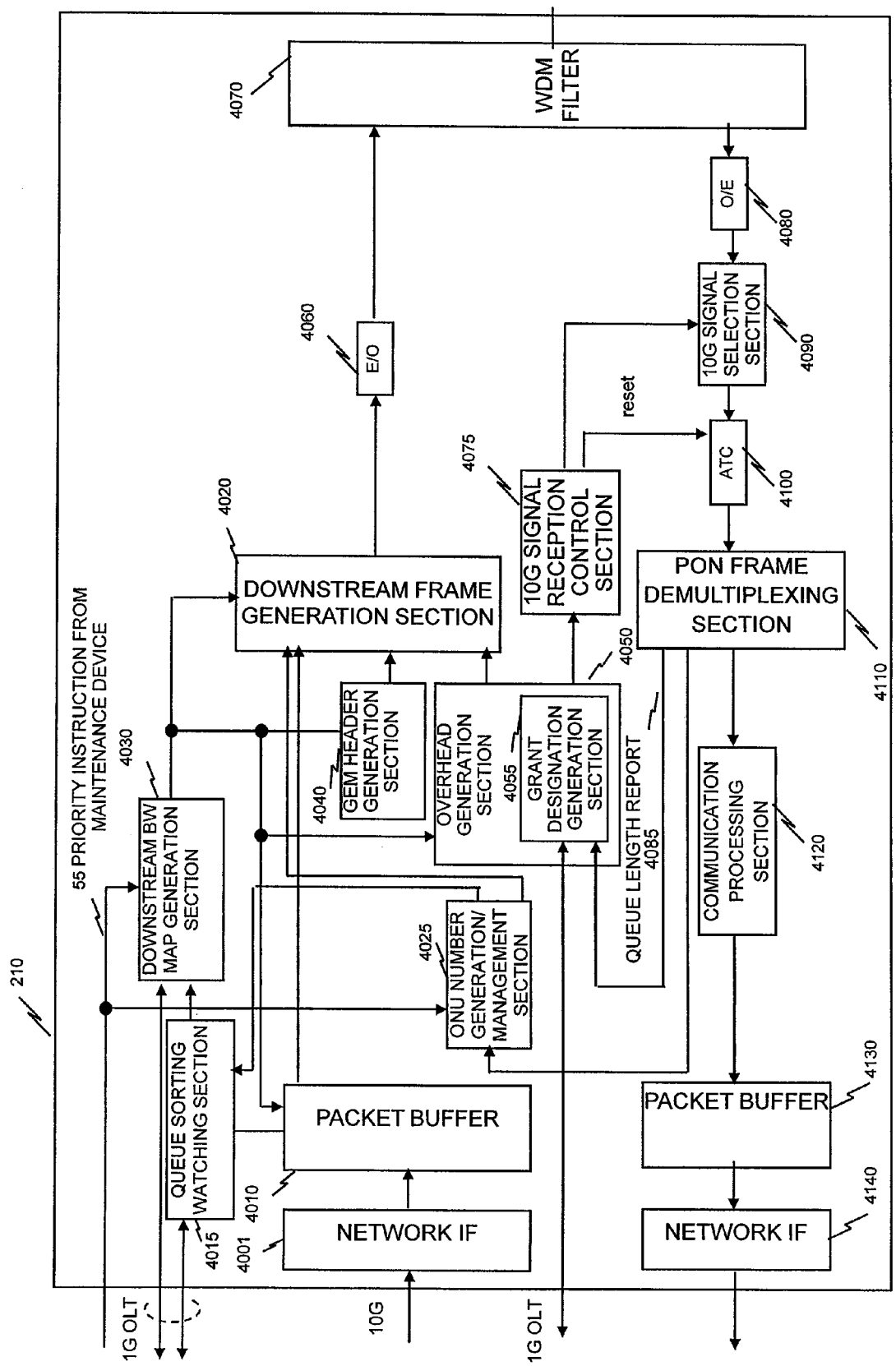
FIG. 6 is a block diagram showing a configuration example of an OLT for 10 Gbit/sec.

FIG. 6 is a block diagram showing a configuration example of the OLT 210 corresponding to 10 Gbit/sec.

The OLT 210 includes, for example, a downstream network IF 4001, a packet buffer 4010, a queue sorting watching section 4015, a downstream frame generation section (transmission section) 4020, an ONU number generation/management section 4025, a downstream BW map generation section (adjustment section) 4030, a GEM header generation section 4040, an overhead generation section 4050, an E/O (optical modulation section) 4060, a WDM filter 4070, a 10 G signal reception control section 4075, an O/E (optical modulation section) 4080, a 10 G signal selection section 4090, an ATC 4100, an upstream PON frame demultiplexing section 4110, a communication processing section 4120, a packet buffer 4130, and an upstream network IF 4140. Further, the overhead generation section 4050 includes a grant designation generation section 4055.

When the OLT 210 receives the data with a transmission rate of 10 Gbit/sec to be transmitted to each of the ONUs 300, 320 in the network IF 4001, which is an interface with a network for performing reception from the host network 20, the received data reaches the packet buffer 4010, and is temporarily stored in a priority-by-priority queue buffer in the packet buffer 4010. The downstream frame generation section 4020 composes the downstream signal (frame) 130-2 shown in FIG. 3 from the stored data, and transmits the downstream signal 130-2 to each of the ONUs 300, 320. The composition of the downstream signal 130-2 is performed by the GEM header generation section 4040, the overhead generation section 4050, and the downstream frame generation section 4020 based on the downstream BW map generated by the downstream BW map generation section 4030. It should be noted that details thereof will be described later. The downstream signal is converted into an optical signal by the E/O 4060, and is transmitted to the ONU via the WDM filter 4070.

Further, when receiving the upstream signal 140 shown in FIG. 3, the signal firstly reaches the upstream PON frame demultiplexing section 4110 via the WDM filter 4070, the O/E 4080, the 10 G signal selection section 4090, and the ATC 4100. In this case, since both of the 10 G signal and the 1 G signal have arrived at the upstream signal, a reset signal for looking-up the grant designation corresponding to this upstream signal and performing a response (a process) only when the 10 G signal, the signal to itself, has arrived is introduced. Since the upstream signals (150 in FIG. 3) from each of the ONUs 300, 320 time-division multiplexed and received by the OLT 210 have a variation in the level of the optical signals, the reset signal also has an effect of executing high-speed and accurate reception of the upstream signal by once resetting the signal reception revel of a reception circuit (e.g., ATC 4100 shown in FIG. 6) of the OLT 210 every time each of the upstream signals 150 (limited to the 10 G signals) is received. The PON frame demultiplexing section 4110 retrieves the queue length information from the upstream signal received from each of the ONUs, and outputs it to the grant designation generation section 4055 as the queue length report 4085. Further, the OLT, which has obtained the queue length report, creates (described later in detail) a new grant designation in cooperation with other OLTs.

Figure 7:
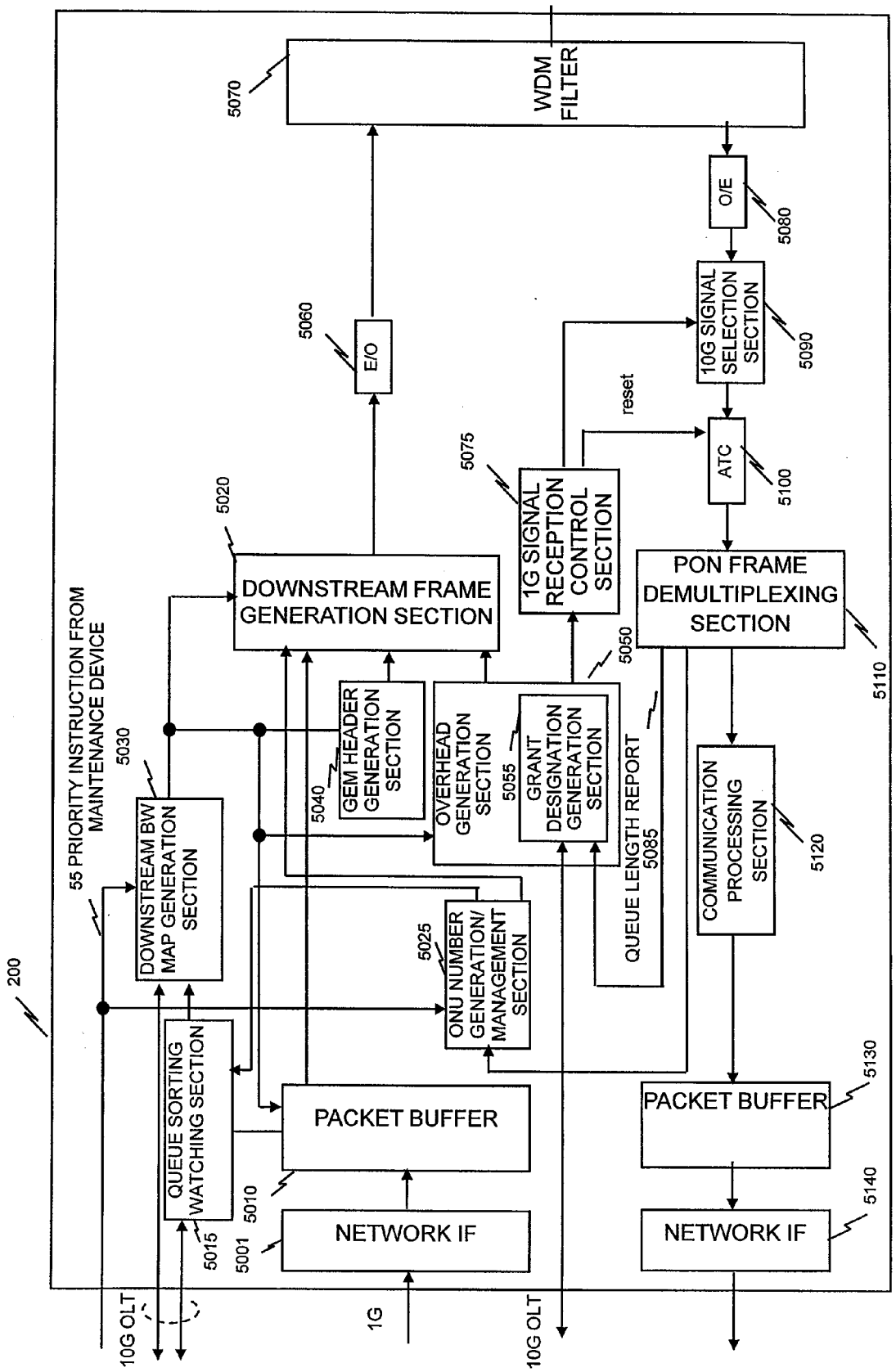
FIG. 7 is a block diagram showing a configuration example of an OLT for 1 Gbit/sec.

FIG. 7 is a configuration example of the OLT 200 corresponding to 1 Gbit/sec. Since the function of each of the blocks becomes the same as those in the OLT 210 corresponding to 10 Gbit/sec providing the function is modified to cope with the difference in transmission rate, detailed explanations thereof will be omitted.

Figure 8:
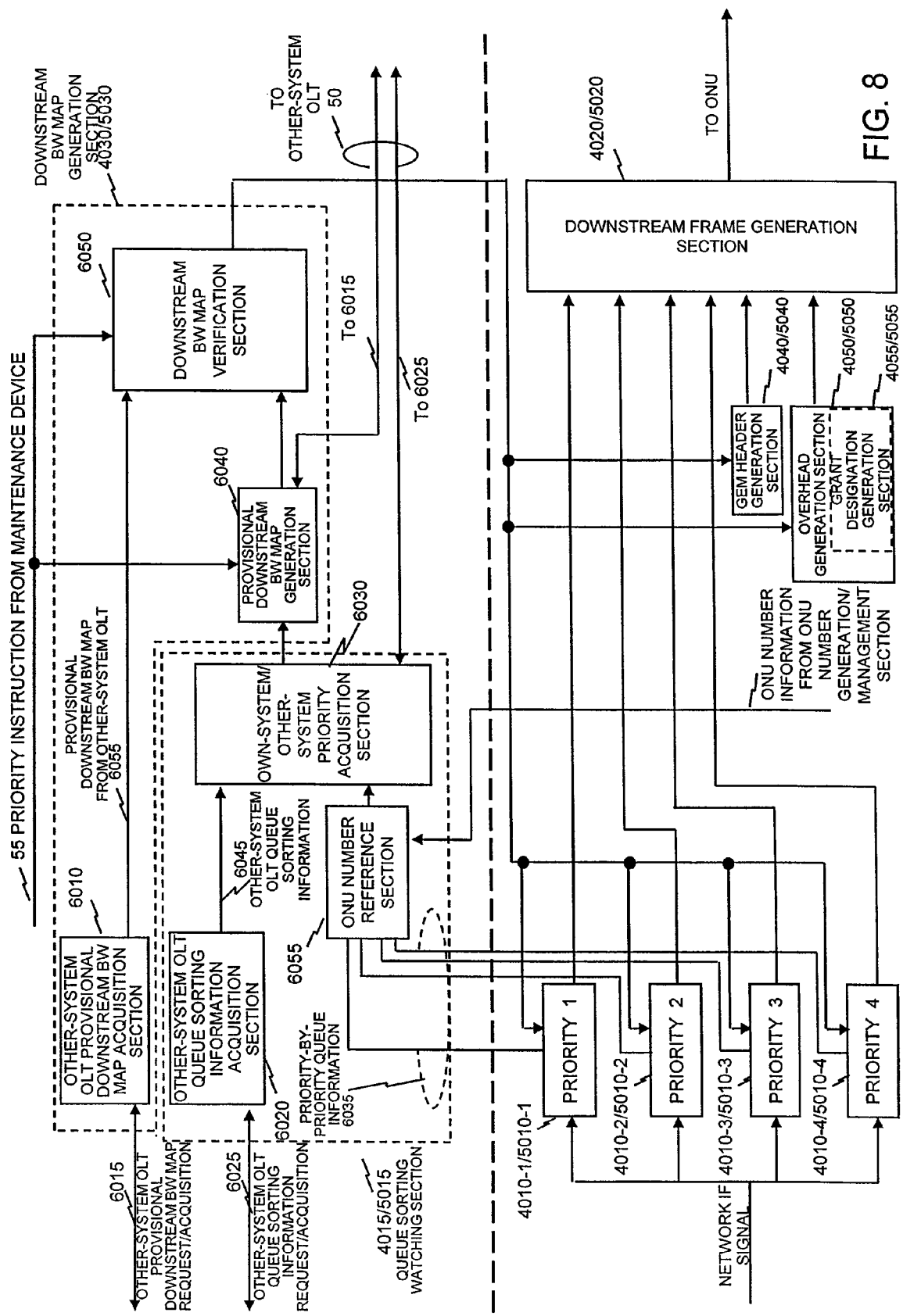
FIG. 8 is a block diagram showing a configuration example of a downstream BW map forming section.

FIG. 8 is a block diagram showing a configuration example of the queue sorting watching section 4015, 5015 and the downstream BW map generation section 4030, 5030 provided to the OLT.

The queue sorting watching section 4015, 5015 includes, for example, an other-system OLT queue sorting information acquisition section 6020, an own-system/other-system priority acquisition system 6030, and an ONU number reference section 6055. The downstream BW map generation section 4030, 5030 includes, for example, an other-system OLT provisional downstream BW map acquisition section 6010, a provisional downstream BW map generation section 6040, and a downstream BW map verification section 6050.

The queue sorting watching section 4015, 5015 obtains the priority-by-priority queue information 6035 of the own-system (e.g., the OLT 210) storing the data obtained from the host network 20. The priority-by-priority queue information 6035 can include a destination and an amount of data stored in each of the queues 4010, 5010. The ONU number reference section 6055 performs ONU number reference of the priority-by-priority queue information thus transmitted based on the information of the ONU number from the ONU number generation/management section 4025, 5025. The operation of the ONU number generation/management section 4025, 5025 will be described later. The priority-by-priority queue information on which the ONU number reference has been executed is notified to the own-system/other-system priority acquisition section 6030 of other-system OLT via the own-system/other-system priority acquisition section 6030 of own-system OLT and the other-system OLT queue sorting information acquisition section 6020 of other-system OLT. The other-system OLT queue sorting information acquisition section 6020 has the role to acquire the priority-by-priority queue information from other-system OLT on which the ONU number reference has been executed and transmit it to the own-system/other-system priority acquisition section 6030 of own-system OLT. The priority-by-priority queue information on which the ONU number reference has been executed is notified to the other-system OLT via the own-system/other-system priority acquisition section 6030. After the own-system/other-system priority acquisition section 6030 acquires the priority-by-priority queue information of the own-system and the other-systems, the provisional downstream BW map generation section 6040 creates the provisional downstream BW map considering the queue sorting information of the both parties and the priority instruction 55 received from the maintenance device (500 in FIG. 3) representing transmission rate and so on to be executed with priority. Specifically, for example, the provisional downstream BW map generation section 6040 creates the provisional downstream BW map in which the data stored on the side of the OLT (e.g., the OLT 210) prompted to be executed with priority (55) by the maintenance device 500 with the nth (n is an integer, n≧1) priority is loaded in the 2n−1th frame of the continuous burst frames while the data stored on the other OLT (e.g., the OLT 200) with the nth priority is loaded in the 2nth frame of the continuous burst frames. The provisional downstream BW map generation section 6040 transmits the provisional downstream BW map created under such a rule to the other-system OLT (50 in FIG. 3). Similarly, the other-system OLT provisional downstream BW map acquisition section 6010 acquires the provisional downstream BW map from the other-system OLTs. The downstream BW map verification section 6050 compares the provisional downstream BW maps respectively created in the own-system and the other-systems, and adopts it as the downstream BW map if the both parties are the same. In the case in which the provisional downstream BW maps of the both parties are not identical, under the instruction from the maintenance device 500, the downstream BW map verification section 6050 determines the provisional downstream BW map, which has been created by the OLT (e.g., the OLT 210) in charge of the transmission rate executed with priority, as the downstream BW map. It should be noted that the forming method of the downstream BW map is not limited to the example described above, but the downstream BW map can be formed by any method based on the priority-by-priority queue information of each of the OLTs.

More specifically, the own-system/other-system priority acquisition section 6030 obtains each of the four levels of the priority-by-priority queue information 6035 from the priority-by-priority buffer 4010, 5010 via the ONU number reference section 6055. Thereafter, the own-system/other-system priority acquisition section 6030 notifies the other-system OLTs of the priority-by-priority queue information of the own-system thus obtained. Since the other-system OLTs also perform the same operations, the own-system/other-system priority acquisition section 6030 can obtain the priority-by-priority queue information of the other-systems via the other-system OLT queue sorting information acquisition section 6020. In this case, when the 10 G OLT 210 is designated by the maintenance device 500 as the prioritized OLT, it is determined that the data (No. 1 in FIG. 10) loaded on the first priority (4010-1) of the 10 G OLT is firstly transmitted with highest priority (updated first priority). Then, it is determined that the data (No. 2 in FIG. 10) loaded on the first priority (5010-1) of the 1 G OLT 200 is transmitted with priority (updated second priority, the same applies below). As the information to be transmitted thirdly, the data (No. 3 in FIG. 10) stored in the second priority (4010-2) in the 10 G OLT prioritized by the maintenance device 500 is selected. As the fourth item, it is determined to transmit the data (No. 4 in FIG. 10) stored in the second priority (5010-2) of the other 1 G OLT. Hereinafter, the updated priorities are obtained in the same manner. The provisional downstream BW map generation section 6040 in the 10 G OLT 210 or the 1 G OLT 200, as described above, creates the provisional downstream BW map, and transmits the creation result to each of the other-system OLTs. The provisional downstream BW map to be transmitted is, for example, as shown in FIG. 10. The downstream BW map 8000 includes, for example, the ONU numbers, transmission timing (start, end), and the transmission rate information (signal). The transmission timing is appropriately determined along the updated priorities. It should be noted that the transmission timing can also be determined based on the amount of data and the contracted band stored in the queue in addition to the priorities. The downstream BW map verification section 6050 in each of the OLTs verifies the provisional downstream BW maps created in the own-system and the other-systems (10 G OLTs and 1 G OLTs), to determine the downstream BW map (FIG. 10). Specifically, if the provisional downstream BW maps of the same systems are identical, the map is directly adopted as the down stream BW map, and if not, the provisional downstream BW map created by the OLT (the 10 G OLT in the present embodiment) prompted by the maintenance device 500 to have the priority is adopted as the true downstream BW map. By passing through the process described above, the each of the OLTs have the same downstream BW map in common. The priority-by-priority downstream data transferred to the downstream PON frame generation section 4020, 5020 based on the downstream BW map thus adopted is composed as the downstream frame together with the GEM header, the overhead, and the grant. It should be noted that in the present embodiment, although the sorting of the data from the host network 20 is performed according to the priority, and divided in to four levels of priority, namely the first priority through the fourth priority, this is mere example of sorting, the number of division is not limited to this value, and can be an arbitrary division number. Further, generation of the overhead and the GEM header except the grant is defined by the Recommendations of G.984 series, the explanations therefor will be omitted here.

Further, by adding the arrival timing of the first stage of each of the transmission rates of the burst frame cluster (assuming cluster A) in subsequent 125 μs to the downstream BW map, the each of the ONUs can be received from the first stage of the cluster A without an error. Specifically, the arrival timing of the first stage of the cluster A to be transmitted next time at each of the transmission rates to the downstream BW map. The downstream BW map (D) 2030, 2031 of the remaining burst frames arriving thereafter of the cluster A is loaded in each of the burst overhead of the first stage of the burst frame at each of the transmission rates of the cluster A. By each of the ONUs figuring out the arrival timing of the frame, it becomes possible that the downstream BW map can be received, and the arrival timing of the burst frames in the cluster A thereafter is surely figured out. More specifically, as shown in FIG. 10, after the information of No. x-2, which is the downstream BW map of the continuous burst frames presently arrived, No. x-1 and No. x, which are arrival timing of the first stage at each of the transmission rate of the subsequent continuous burst frames (the cluster A) are added. In this case, in FIG. 10 sited as an example, although the destination of the first stage is set to a specific ONU, if the setting of the reception of each of the ONUs is set to receive only the signal addressed to the own ONU, the destination in the downstream BW map can be set as the all ONUs. By adopting this measure, each of the ONUs can perform the reception operation without causing an error not only in the continuous burst frames but also in the continuous burst frames arriving subsequently.

Figure 9:
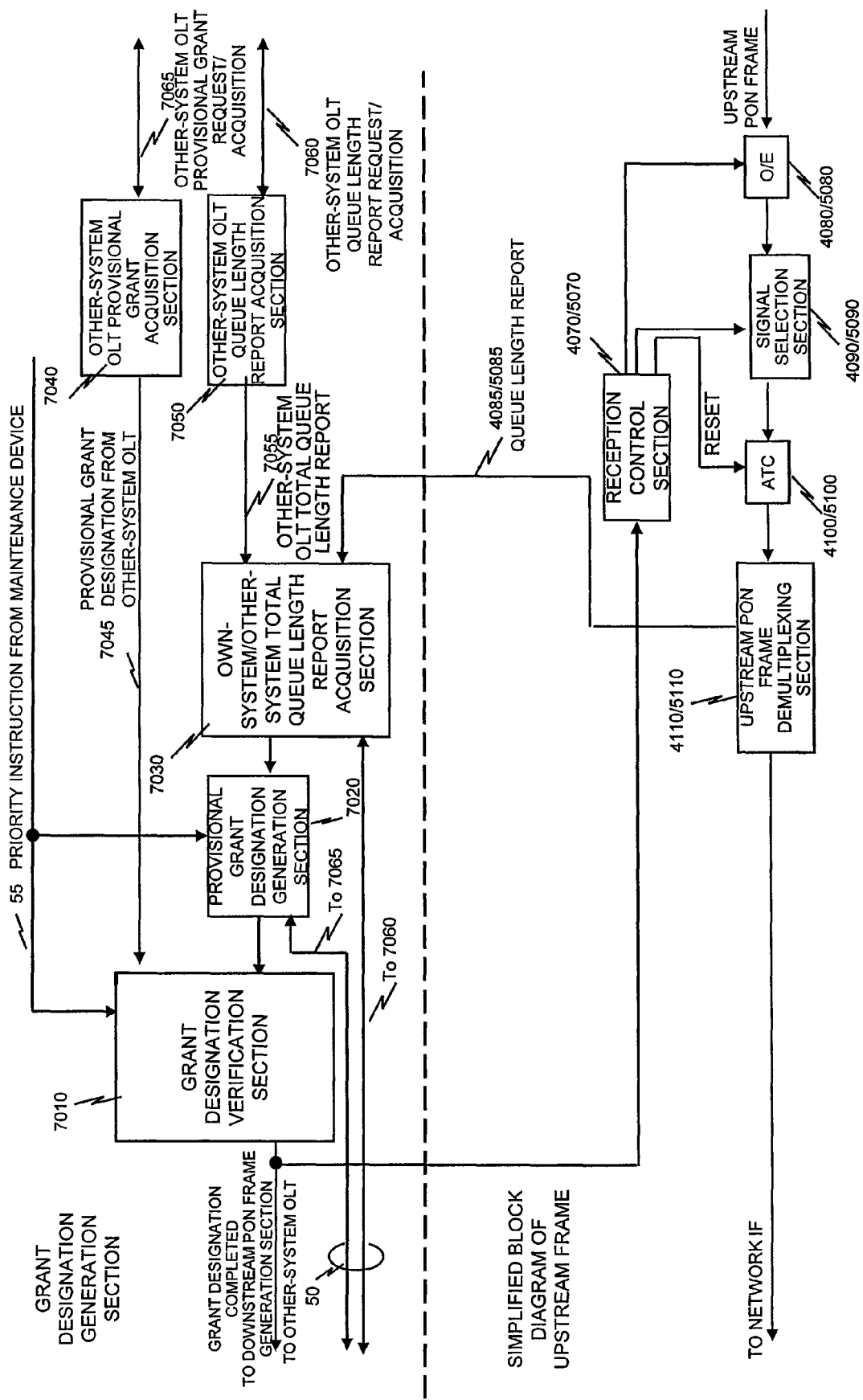
FIG. 9 is a block diagram showing a configuration example of a grant generation section.

FIG. 9 is a configuration diagram of the grant designation generation section 4055, 5055 provided to the overhead generation section 4050, 5050.

The grant designation generation section 4055, 5055 includes, for example, a grant designation verification section 7010, a provisional grant designation generation section 7020, an own-system/other-system total queue length report acquisition section 7030, an other-system OLT provisional grant designation acquisition section 7040, and an other-system OLT queue length report acquisition section 7050.

The grant designation is generated based on the queue length report 4085, 5085 obtained from each of the ONUs. When receiving the upstream signal, the own-system/other-system total queue length report acquisition section 7030 receives the queue length report 4085, 5085 obtained from each of the ONUs of the own-system, and transmits it to the other-system OLTs (50 in FIG. 3). Similarly, the other-system OLT queue length report acquisition section 7050 receives the queue length reports of the other-system OLTs, and transfers the reports to the own-system/other-system total queue length report acquisition section 7030. The provisional grant designation generation section 7020 generates the provisional grant designation based on the queue length reports of the own-system and the other-systems transmitted from the own-system/other-system total queue length report acquisition section 7030. Specifically, there is formed the provisional grant designation for assigning the 2n−1th order (n≧1) and the necessary size of the upstream signal to the ONU judged to have nth priority from inside the queue length report on the side of the OLT prompted by the maintenance device (500 in FIG. 3) to have priority (55), and assigning the 2 nth order and the necessary size of the upstream signal to the ONU judged to have the nth priority from inside the queue length report on the side of the other OLT in the subsequent frame. In order for judging the priority from the queue length report, an appropriate judgment can be executed such that higher priority is given to the queue having more data stored therein.

More specifically, the own-system/other-system total queue length report acquisition section 7030 in the 1 G OLT 200 or the 10 G OLT 210 firstly obtains the queue length report from the own-system ONU (the 1 G ONU 310 in the case of the 1 G OLT, or the 10 G ONU 300 in the case of the 10 G OLT). It should be noted that in the present embodiment, since the 1 G/10 G ONU 320 operates as the 10 G ONU, the queue length report of the 1 G/10 G ONU 320 is transmitted to the 10 G OLT 210. Thereafter, the own-system/other-system total queue length report acquisition section 7030 transmits the queue length report of the own-system to the OLTs (from the 1 G OLT 200 to the 10 G OLT 210, or from the 10 G OLT 210 to the 1 G OLT 200) of the other-systems. The own-system/other-system total queue length report acquisition section 7030, which has obtained the queue length report of the transmission rate of the other-system via the other-system OLT queue length report acquisition section 7050, transmits the information to the provisional grant designation generation section 7020.

The provisional grant designation generation section 7020 generates the provisional grant designation based on the queue length reports of the both transmission rates received from the own-system/other-system total queue length report acquisition section 7030. Assuming that the priority instruction from the maintenance device is provided to the 10 G OLT, and the 1 G/10 G ONU operates as the 10 G ONU, in the present embodiment, the provisional grant designation designates the data of the ONU to be provided with the highest priority based on an arbitrary algorism in the 10 G ONU 300 or the 1 G/10 G ONU 320, and determines the necessary band based on the data (No. 1 in FIG. 11). Subsequently, the necessary band is set so that the data (No. 2 in FIG. 11) of the ONU to be provided with the highest priority in the 1 G ONU 310 to be transmitted and received with the 1 G OLT 200, which do not receive the priority instruction, is transmitted secondly. Thirdly, the band necessary for transmitting the relevant data (No. 3 in FIG. 11) of the ONU having data to be provided with the second highest priority in the 10 G ONU 300 or the 1 G/10 G ONU 320 to be transmitted and received with the 10 G OLT 210, which has received the priority instruction, is assured. Fourthly, the band necessary for transmitting the relevant data (No. 4 in FIG. 11) of the ONU having data to be provided with the second highest priority in the 1 G ONU 310 to be transmitted and received with the 1 G OLT 200, which do not receive the priority instruction, is assured. Similarly, the band is assured to each of the ONUs. The provisional grant designation generation section 7020 also notifies the other-system OLTs of the provisional grant designation thus generated (50 in FIG. 3). Similarly, the other-system OLT grant designation acquisition section 7040 acquires the provisional grant designation from the other-system OLT. It should be noted that the prioritization can be performed based on the queue length report in each of the OLT adopting an appropriate algorism considering the conditions such as the traffic of the data processed by the provider of the PON 10, and detailed operational explanations will be omitted here.

Figure 11:
FIG. 11 is a table configuration diagram showing a configuration example of a grant designation.

The grant designation verification section 7010 receives the provisional grant designation formed by the own-system OLT from the provisional grant designation generation section 7020, and in addition, obtains the provisional grant designation formed by the other-system OLT from the other-system OLT provisional grant designation acquisition section 7040. Thereafter, the grant designation verification section 7010 verifies the provisional grant designations of the same systems to determine the true grant designation (FIG. 11). Specifically, if the both provisional grant designations are identical, the provisional grant designation is certified as the true grant designation, and if by any chance they are not identical, the provisional grant designation formed by the OLT to which the maintenance device 500 gives priority is determined as the true grant designation. By passing through this process, the OLTs and the ONUs can have the common grant designation in common.

An example of the downstream BW map thus generated is shown in FIG. 10, and an example of the grant designation thus generated is shown in FIG. 11. It should be noted that the assignments shown in the drawings are mere examples, and the present embodiment is not limited to the assignments.

At any rate, the PON 10 of the present embodiment transmits and receives the upstream and the downstream signals of 1 G/10 G PON with the burst frames based on the downstream BW map and the grant designation, thereby allowing communication of 1 G PON and 10 G PON to coexist.

The downstream frame generation section 4020, 5020 of the OLT 200, 210 composes the downstream signals 130-1, 130-2 as described below using the packet buffer 4010, 5010 operating based on the downstream BW map generation section 4030, 5030, the GEM header generation section 4040, 5040, and the overhead generation section 4050, 5050.

(1) In response to the signal from the overhead generation section 4050, 5050, the overhead including the frame sync pattern 2000, 2001, and the PLOAM field 2010, 2011 is composed. It should be noted that the grant designation field 2020, 2021 and the downstream BW map 2030, 2031 are added only to the burst overhead in the first stage.

(2) In the frame payload 2040, 2041 after the overhead, in the order of the decision of the downstream BW map, the GEM header 2050, 2051 addressed to each of the ONUs 300, 310, and 320 received from the GEM header generation section 4040, 5040, and the data addressed to each of the ONUs 300, 310, and 320 retrieved from the packet buffer (queue) 4010, 5010 are formed.

(3) Since the downstream BW map generation section 4030, 5030 defines the length of the data time-division multiplexed in each of the burst frame and addressed to the ONUs 300, 310, and 320 and the guard time 2200 so that the entire frame length becomes 125 μs, (2) is repeated along the definition.

The downstream signal composed by the downstream frame composing section 4020, 5020 is converted from the electrical signal into an optical signal by the optical modulation section (E/O, 4060, 5060), and transmitted to the backbone optical fibers 110-1, 110-2 as the downstream signals 130-1, 130-2 via the WDM filter 4070, 5070. The downstream signals 130-1, 130-2 form the downstream signal 135 through the optical splitter 100-1, and are broadcasted to the ONUs 300, 310, and 320 via the optical splitter 100-2.

According to the configuration and the operation of the OLT described above, even when high-speed data transmission such as 10 Gbit/sec is newly required to the GPON operating at 1 Gbit/sec, it becomes possible to easily provide a PON equipped with the OLT and the ONU each having a configuration capable of accommodating and operating the signals different in transmission rate, and a communication method thereof. It should be noted that the configuration and the operation regarding the processing of the upstream signals will separately be explained after once explaining the configuration and the operation of the ONU below.

ONU

Figure 12:
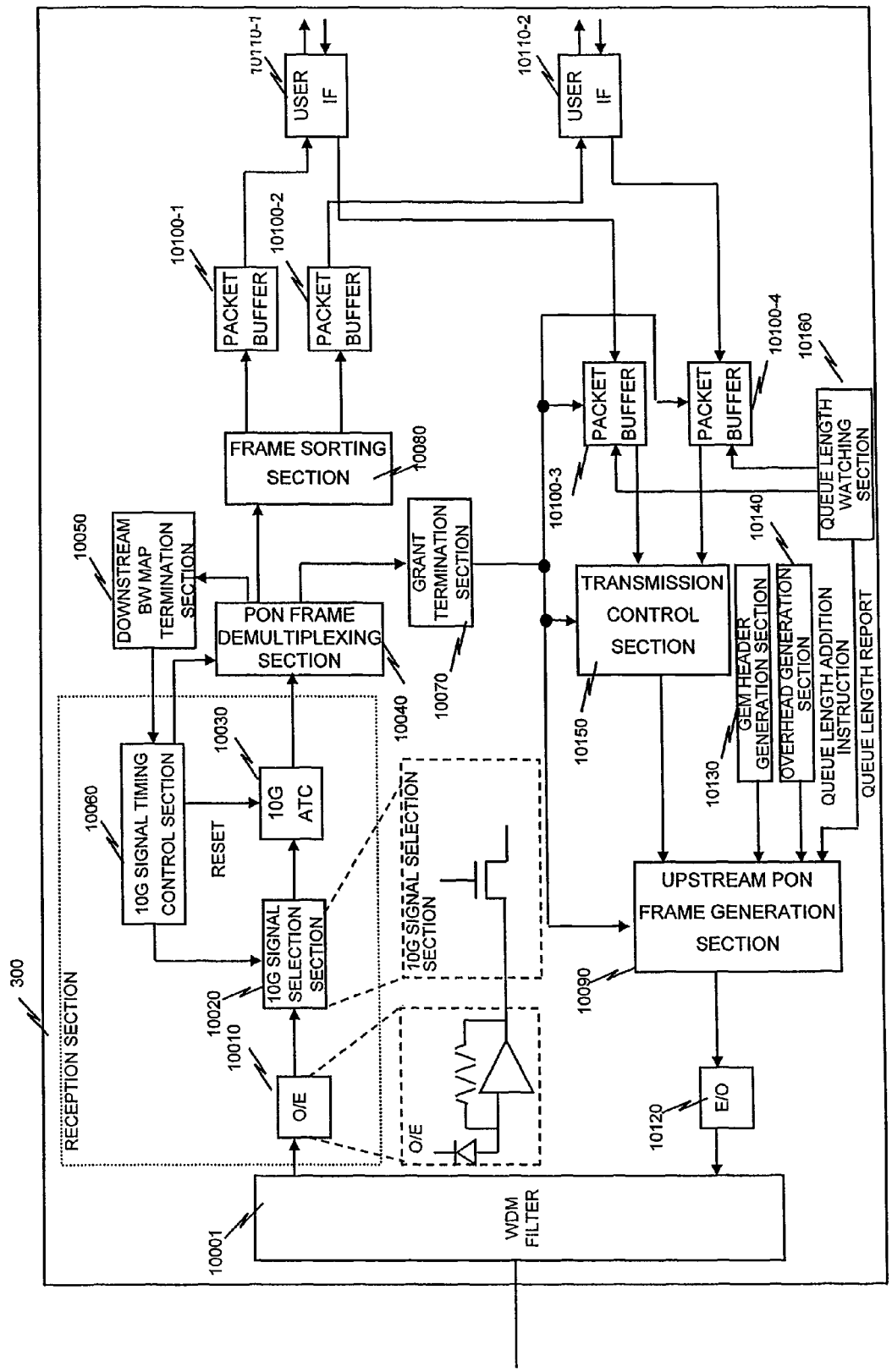
FIG. 12 is a block diagram showing a configuration example of an ONU for 10 Gbit/sec.

FIG. 12 is a block diagram showing a configuration example of the ONU 300 for 10 Gbit/sec.

The ONU 300 includes a WDM filter 10001, an O/E section 10010, a 10 G signal selection section 10020, a 10 G ATC 10030, a PON frame demultiplexing section 10040, a downstream BW map terminal section 10050, a 10 G signal timing control section 10060, a grant terminal section 10070, a frame sorting section 10080, an upstream PON frame generation section 10090, a packet buffer 10100, a user IF 10110, an E/O section 10120, a GEM header generation section 10130, an overhead generation section 10140, a transmission control section 10150, and a queue length watching section 10160. It should be noted that the O/E section 10010, the 10 G signal selection section 10020, the 10 G ATC 10030, and the 10 G signal timing control section 10060 are collectively referred to as a receiving section.

The downstream signal 135 received from the feeder optical fiber 120 is converted into an electrical signal by the O/E section 10010 for converting an optical signal into an electrical signal via the WDM filter 10001. The 10 G signal selection section 10020 discards 1 G signals, and 10 G signals pass through the 10 G signal selection section 10020. Further, since the 10 G signal is attenuated when passing through the optical fibers 110, 120, and the optical splitter 100, the 10 G signal is converted by the 10 G ATC 10030 into a signal with a predetermined signal level, and then output to the PON frame demultiplexing section 10040.

The PON frame demultiplexing section 10040 separates the overhead and the payload multiplexed into the downstream signal 135 thus received. Although detailed operations will be omitted from the description, when detecting the beginning of the downstream signal 135 with the frame sync pattern 2000, the PON frame demultiplexing section 10040 performs setting necessary for the operation of the ONU based on a PON control message included in the PLOAM field 2010. Further, the PON frame demultiplexing section 10040 creates a control message including a watching result of the own ONU, a control content required to the OLT, and so on, and then puts the message in the PLOAM field 3020 of the upstream signal 150 to transmit it to the OLT 210. It should be noted that in the case in which the burst frame arrived thereat is the first stage of the 10 G signal in the series of burst frames, the PON frame demultiplexing section 10040 takes out the downstream BW map to output it to the downstream BW map terminal section 10050. Based on the downstream BW map input to the downstream BW map terminal section 10050, the 10 G signal timing control section 10060 performs a judge between the 1 G signal and the 10 G signal described above. In the timing control, since the downstream BW map includes the state of the signal addressed to itself, it is possible to perform setting for acquiring only the burst frame including the signal addressed to itself in the 10 G signal instead of uniformly acquiring the 10 G signal.

Further, in the case in which the burst frame of the 10 G signal arriving thereat is the first stage of the 10 G signal in the series of burst frames, the grant designation field 2020 is also loaded, the PON frame demultiplexing section 10040 outputs the grant designation to the grant terminal section 10070. The grant terminal section 10070 extracts the grant addressed to the own ONU from the grant included in the grant designation field 2020 to determine the transmission timing of the upstream signal of the own ONU. The transmission control section 10150 extracts the information of the packet buffer 10100 based on the transmission timing, and the upstream PON frame generation section 10090 generates the upstream signal 150 to transmit it to the OLT 210.

Further, the PON frame demultiplexing section 10040 confirms the content of the GEM header 2050 multiplexed into the burst frame payload 2040. Here, if the GEM header 2050 is addressed to the own ONU, the PON frame demultiplexing section 10040 transmits the data of the payload 2060 following the GEM header to the frame sorting section 10080, and discards other GEM header and data of other payload.

The frame sorting section 10080 once stores the received data in the packet buffer 10100 for every destination terminal 400, 410, and then transmits the stored data to the respective terminals 400, 410 via the user IF 10110 as the interface with the terminals.

Figure 13:
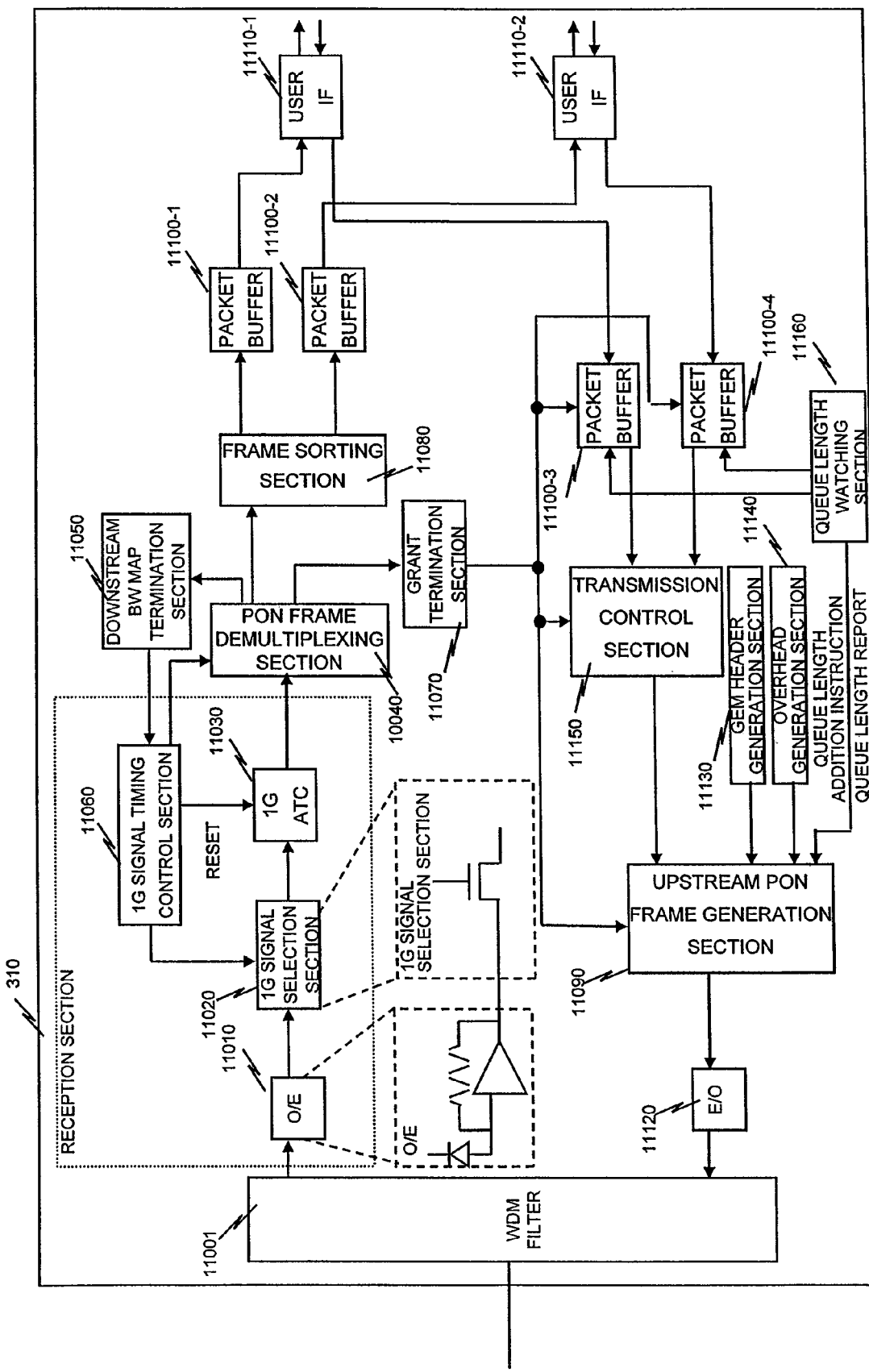
FIG. 13 is a block diagram showing a configuration example of an ONU for 1 Gbit/sec.

FIG. 13 is a block diagram showing a configuration example of the ONU 310 for 1 Gbit/sec. Since the function of each of the blocks becomes the same as those in the ONU 300 for 10 Gbit/sec providing the function is modified to cope with the difference in transmission rate, detailed explanations thereof will be omitted.

Figure 14:
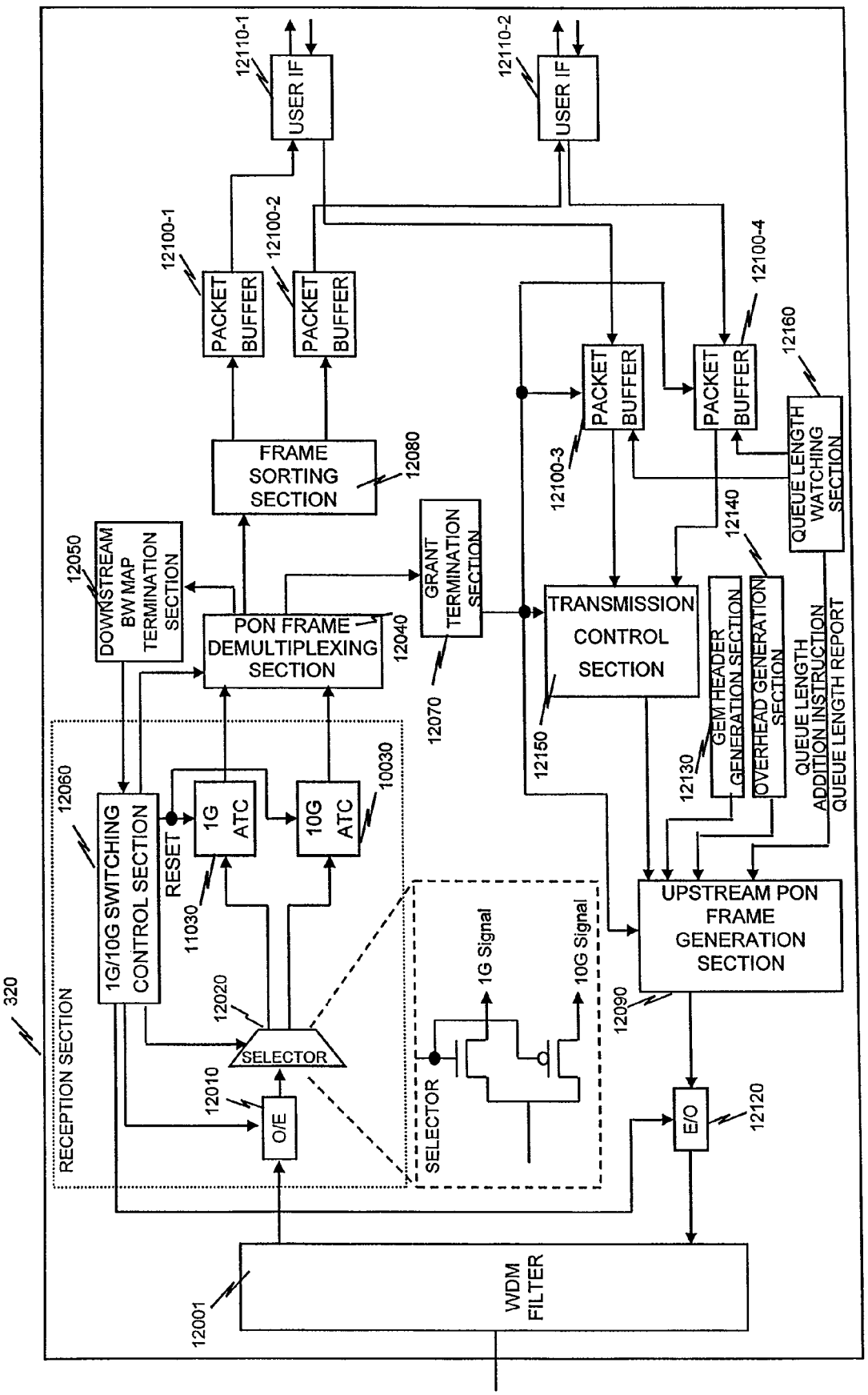
FIG. 14 is a block diagram showing a configuration example of an ONU for 1 Gbit/sec and 10 Gbit/sec.

FIG. 14 is a block diagram of the ONU 320 capable of coping with the both transmission rates of 1 Gbit/sec and 10 Gbit/sec.

The ONU 320 is different from the ONU 300 for 10 Gbit/sec and the ONU 310 for 1 Gbit/sec in that it can change the transmission rate it can cope with based on the downstream BW map loaded in the first stage of the downstream burst frames. A 1 G/10 G switching control section 12060 for switching the receiver between the modes respectively corresponding to the 1 G signal and the 10 G signal is provided instead of the timing control sections 10060, 11060 of the ONUs 300, 310. Instead of the signal selection sections 10020, 11020, a selector 12020 of the 1 G signal and the 10 G signal is mounted, the ATCs 10030, 11030 are both, namely two kinds, provided so as to be able to cope with both of the 1 G signal and 10 G signal. Further, the O/E section 12010 has a configuration in which the impedance value can appropriately be switched since there can be the case in which the impedance value used therein varies depending on the kind of the signal, namely the 1 G signal or the 10 G signal, in the conversion between the optical signal and the electrical signal. The E/O section 12120 has a configuration of adjusting the transmission power since it is possible that the transmission power varies depending on the kind of the signal, namely the 1 G signal or the 10 G signal, in the conversion between the electrical signal and the optical signal. Since the functions as the block diagram in other sections are substantially the same, detailed explanations therefor will be omitted.

Which one of a first transmission rate (1 G) signal and a second transmission rate (10 G) signal is received, for example, is previously set to the 1 G/10 G switching control section 12060, and the 1 G/10 G switching control section 12060 switches the transmission rate used for receiving signals based on the setting. The selector 12020 takes out the signal with the first transmission rate or the second transmission rate out of the signals received from the OLTs 200, 210 along, for example, the instruction of the switching control section 12060.

The upstream data transmitted from each of the terminals 400, 410 is once stored in the packet buffer 10100, 11100, 12100 via the user IF 10110, 11110, 12110. Then, the data is composed to be the upstream signal 150 as described below in the upstream PON frame generation section 10090, 11090, 12090 based on the timing of the grant terminal section 10070, 11070, 12070, then converted into the optical signal in the E/O section 10120, 11120, 12120, and then transmitted to the OLTs 200, 210 via the WDM filter 10001, 11001, 12001 by way of the feeder optical fiber 120.

(1) The data corresponding to the band (an amount of data allowed to be transmitted) determined by the OLT 200, 210 in the grant designation is retrieved from the respective packet buffer 10100, 11100, 12100 to generate the 5 G payload (3310 in FIG. 5) or the 1 G payload (3311 in FIG. 5).

(2) The GEM header (3300, 3301 in FIG. 5) generated by the GEM header generation section 10130, 11130, 12130 is added in front of the 5 G payload 3310 of the 1 G payload 3311 to form the frame payload (3040, 3041 in FIG. 5). The GEM header 3300, 3301 has the configuration shown in the part (C) of FIG. 5, the details of each of the bytes is defined by the Recommendations of G.984 series, and the explanation thereof will be omitted here. It should be noted that as described above the PORT ID 3410, 3411 is set to each of the ONUs 300, 310, and 320.

(3) The communication control section 10150, 11150, 12150 puts the control message including the watching result of the own ONU, a control content to be required to the OLT, and so on in the PLOAM field 3020, 3021 of the upstream signal 150. Further, the queue length watching section 10160, 11160, 12160 watches the amount of data stored in each of the packet buffers 10100, 11100, 12100, waiting to be transmitted to the OLT 200, 210, and put the amount of the data in the queue length field 3030, 3031 defined between the PLOAM field 3020, 3021 and the frame payload 3040, 3041 as the queue length report.

(4) In front of the burst data 3120, 3121 having the control signal 3110, 3111 including the PLOAM field 3020, 3021 and the queue length field 3030, 3031 added in front of the frame payload 3040, 3041, the burst overhead 3100, 3101 including the preamble field 3000, 3001 and the delimiter field 3010, 3011 generated by the overhead generation section 10140, 11140, 12140 is added, and the resulting burst data is converted in the E/O section 10120, 11120, 12120 from the electrical signal to the optical signal, thus the upstream signal 150 is composed. The upstream signal 150 is transmitted with the guard time 3200 added thereto based on the grant designated from the OLT 200, 210 with the designated timing.

Operation of PON

Then, the flow of the operation of the PON 10 (FIG. 3) prior to the normal operation will briefly be explained. When each of the OLTs starts up, the OLT performs assignment of the ONU numbers to each of the ONUs based on the G.984 series. Since the transmission timing among the OLTs is not fixed at this moment, there is a possibility of collision of the signals to each of the ONUs. Therefore, the OLT (e.g., the 10 G OLT (210 in FIG. 3)) having the priority instruction from the maintenance device 500 firstly assigns the ONU numbers based on the G.984 series with priority, and in the meantime, the other-system OLTs (the 1 G OLT (200 in FIG. 3)) are in a wait-and-see condition. Specifically, based on the G.984 series, an ONU number generation/management section 4025 (FIG. 6) in the 10 G OLT 210 confirms that the priority instruction is received from the maintenance device 500, and assigns the ONU number to each of the ONUs. According to this operation, the ONU numbers are firstly assigned to the 10 G ONUs 300, respectively. Since the signal from the 10 G OLT 210 is recognized as an error signal by the 1 G ONU 310 at this moment, the ONU number is not assigned to the 1 G ONU 310. When the assignment of the ONU numbers by the 10 G OLT 210 to the subsidiary relevant ONUs is completed, the 10 G OLT 210 becomes in the wait-and-see condition, and the ONU number generation/management section 5025 (FIG. 7) in the 1 G OLT 200 assigns the ONU number to each of the ONUs based on the G.984 series, thus the ONU numbers are assigned only to the 1 G ONUs 310 for the same reason as described above. For example, it is possible that the OLT 210 transmits a notification of termination of the assignment to the OLT 200 when the assignment of the ONU numbers has been completed. In order for avoiding duplication of the ONU numbers assigned by the 1 G OLT 200 with the ONU numbers assigned by the 10 G OLT 210, it is possible to take measures for previously setting the range of the numbers to be used to some extent such that the range of the ONU numbers assigned by the 1 G OLT 200 is set to 1 through 32 while the range of the ONU numbers assigned by the 10 G OLT 210 is set to 33 through 64. This measure is cited as nothing but a mere example, and the present embodiment is not necessarily limited to this assignment of the ONU numbers. At any rate, in the case of assigning the ONU numbers, it is enough to assign the ONU numbers so as not to cause duplication of the ONU numbers assigned by each of the OLTs.

Subsequently, ranging, which is measurement of a distance, is executed. In this case, only the OLT (e.g., the 10 G OLT 210) prioritized by the maintenance device 500 through the connection 55 shown in FIG. 3 performs the operation based on the G.984 series, and for the same reason as described above, only the distance of the own-system ONU (the 10 G ONU 300) can be determined. Thereafter, the OLT is switched, only the other-system OLT (the 1 G OLT 200) operates based on the G.984 series, and the OLT (the 10 G OLT 210), which has operated earlier, becomes in the wait-and-see condition. As a result, the distance of each of the 1 G ONUs 310 from the OLT comes out. It should be noted that the 1 G/10 G ONU 320 can start up at either transmission rate. Since the signal from the host network to the present ONU comes out by the downstream BW map, by receiving the burst data of the first stage at each of the transmission rates in the bust frames in the normal operation, the transmission rate with which the ONU receives the signal thereafter comes out, and by switching to the corresponding transmission rate before the arrival of the data with the corresponding transmission rate, transmission and reception without any problems becomes possible.

The operation described above will be explained with reference to the flowcharts.

Figure 1:
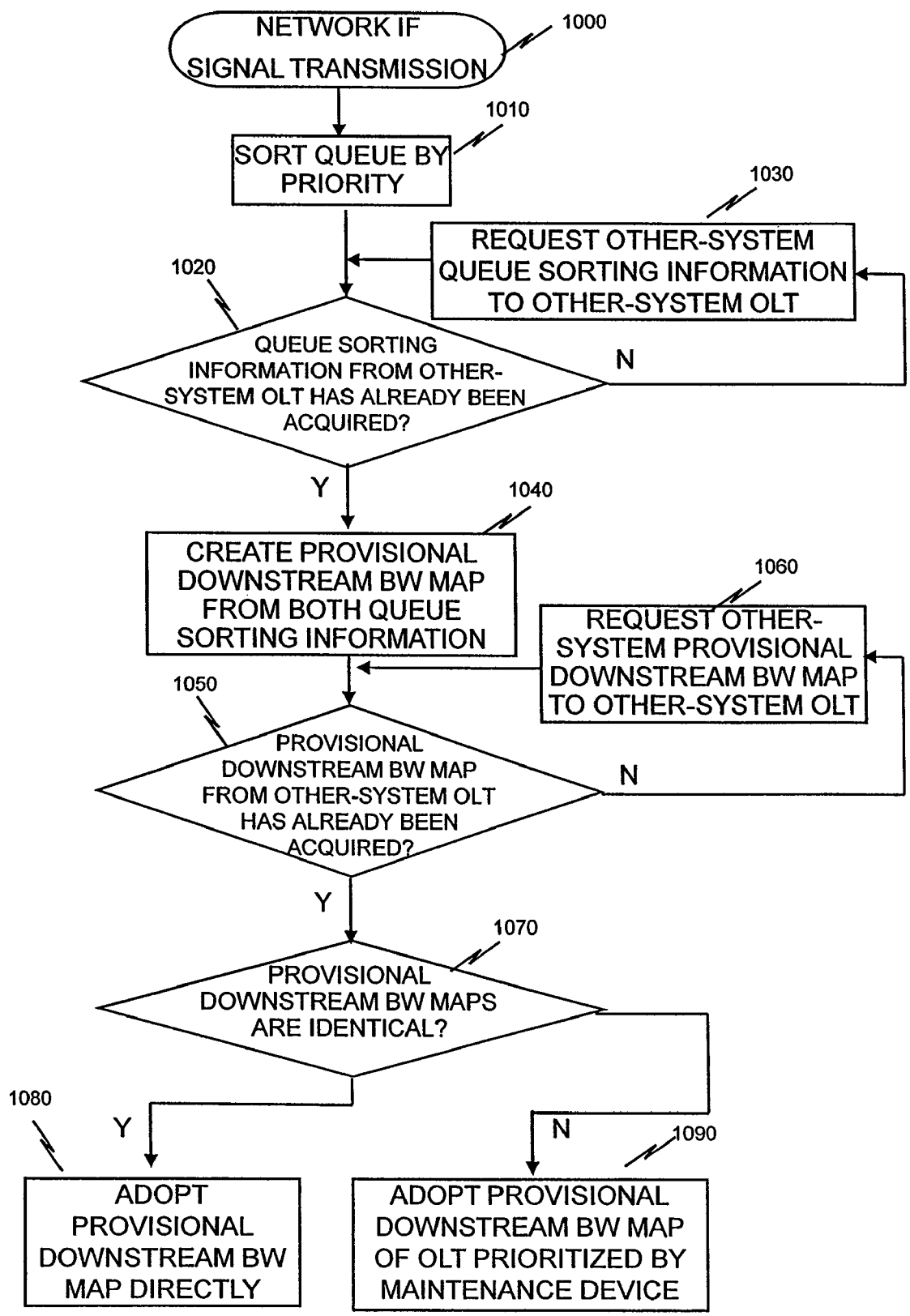
FIG. 1 is a flowchart showing flow of forming a downstream BW map.

FIG. 1 is a flow diagram showing flow of forming a downstream BW map.

In each of the OLTs, data is received (1000), and the data is sorted in the priority-by-priority queue (1010). Further, the OLT also notifies the other-system OLTs of the result (referred to as priority-by-priority queue information). In the case in which the OLT does not acquire the priority-by-priority queue information of the other-system OLTs, the OLT performs request of priority-by-priority queue information (1020, 1030). The OLT, which has received the priority-by-priority queue information of the other-system, creates provisional transmission timing (referred to as the provisional downstream band width (BW) map) based on the priority-by-priority queue information of the own-system and the other-system, and the priority as the OLT received from the maintenance device (1040). Further, the OLT acquires the provisional downstream BW map created by the other-system OLT (1050, 1060). The OLT compares the provisional downstream BW map obtained from the other-system OLT with the provisional downstream BW map of the own system to determine the timing of the transmission from each of the OLTs to each of the ONUs (referred to as the downstream BW map) (1070, 1080, 1090).

Each of the ONUs receiving the transmission frame created based on the downstream BW map reads the downstream BW map included in the header, and learns the timing of its own reception. In other words, it responds only to the transmission rate it can cope with, and it can be avoided that an error is detected in the frame with a transmission rate it cannot cope with.

Figure 2:
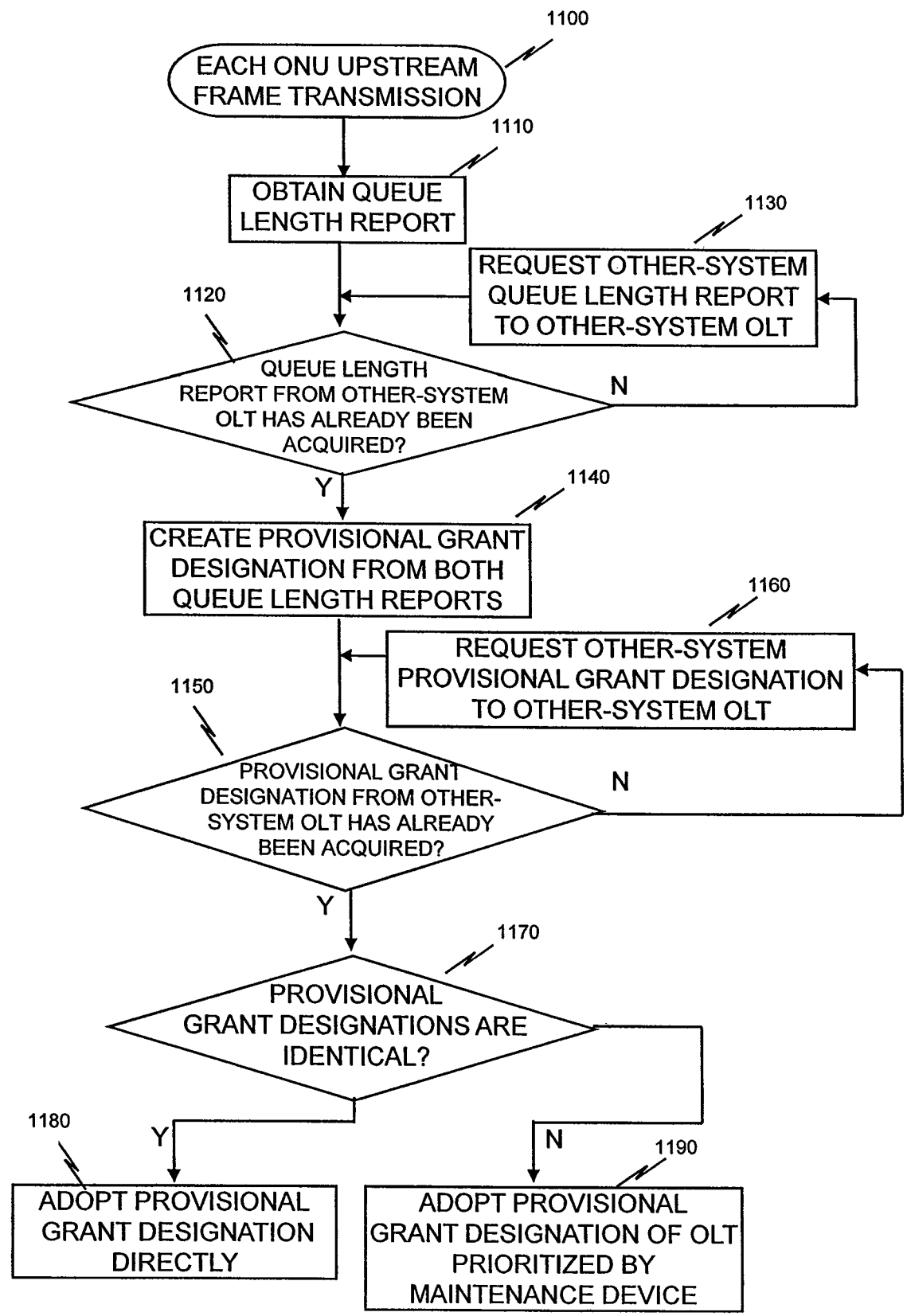
FIG. 2 is a flowchart showing flow of forming a grant designation.

FIG. 2 is a flow diagram for determining the timing of the frame transmitted from each of the ONUs to each of the OLTs.

Firstly, the OLT acquires the queue length reports (referred to as the other-system total queue length report) with different transmission rates from other OLTs in addition to the queue length report (1110) obtained from each of the ONUs (1120, 1130). The OLT considers the both parties comprehensively to generate the grant (referred to as the provisional grant designation) (1140). This provisional grant designation is not used directly, the provisional grant designation created by the other-system OLT is also acquired (1150, 1160). Thereafter, the provisional grant designation created by the own system OLT and the provisional grant designation created by the other-system OLT are compared with each other. As a result, if they are identical, the provisional grant designation is directly adopted as a formal grant designation, and if they are not identical, the provisional grant designation on the side of the OLT receiving the priority instruction from the maintenance device is adopted as the formal grant designation (1170, 1180, 1190).

The downstream BW map and the grant designation created by the OLT are loaded only on the first stage of the signal formed as the burst frames at each of the transmission rates, and the frames following thereto are each composed of the header and the frame other than the downstream BW map and the grant. In other words, the continuous frame of 125 µs in the related art is replaced with the configuration of the continuous burst frames transmitted from each of the OLTs with the timing defined in the downstream BW map. According to this configuration, when each of the ONUs transmits the cluster of the continuous burst frames of 125 µs, by receiving the first stage of the burst frames of each of the transmission rate, the kind of transmission rate and the timing of the burst frames in the following stages can be figured out, the timing of transmission from each of the ONUs to each of the OLTs can also be figured out. Regarding the continuous burst frames, which will arrive subsequently, the timing of the burst frame of the first stage of the subsequent continuous burst frames at each of the transmission rates has come out when receiving the previous continuous burst frames. Further, since the downstream BW map and the grant designation are loaded again from the first stage when receiving the subsequent continuous burst frames, the configuration does not cause a problem in the communication between each of the OLTs and each of the ONUs.

As explained hereinabove, according to the configurations and the operations of the PON, the OLT, and the ONU of the present embodiment, it becomes possible to easily provide the PON having a configuration capable of making transition to a new PON while accommodating the existing facilities of the PON, and of operating the PONs in a mixed manner and a communication method therefor. Further, it becomes possible to easily provide a PON having a configuration in which two or more PONs with different specifications (standards) exist and are operated in a mixed manner and a communication method therefor. It should be noted that even if two or more PONs exist in a mixed manner, the contents of the PONs are never mistakenly construed, and warning or a malfunction is never caused. Further, in the PON in which the communication signal transmitted from the OLT to the ONU is time-division multiplexed, it becomes possible to accommodate two or more ONUs with different transmission rates in a mixed manner, and when a request for expanding the communication service capacity arises, the expense of replacing the communication devices can be suppressed by replacing only the relevant OLT and the ONU.

The present invention can be applied to, for example, a PON system.

What is claimed is:

1. A passive optical network system, in which fixed-length frames, each of the fixed-length frames including a plurality of variable-length frames, are transmitted from master stations to slave stations, the passive optical network system comprising:
    a first master station for communicating at a first transmission rate;
    a second master station for communicating at a second transmission rate different from the first transmission rate;
    a first slave station for communicating with the first master station at the first transmission rate;
    a second slave station for communicating with the second master station at the second transmission rate; and
    an optical fiber network having a first splitter and a second splitter, variable-length frames from the first master station and the second master station being time-division multiplexed via the first splitter, and multiplexed variable-length frames being transmitted to the first and second slave stations via the second splitter,
    wherein the first master station and/or the second master station include:
    queues corresponding to previously determined priority, and for storing data to be transmitted to one of the first slave station and the second slave station,
    a queue sorting watching section for obtaining priority information of the queues of the own master station, and obtaining priority information of the queues from the other master station,
    an adjustment section for determining transmission timing of the variable-length frames transmitted from the first and second master stations based on the priority information of the queues of the own master station and the priority information of the queues of the other master station, which are obtained by the queue sorting watching section, and priority instruction information of the master stations previously defining which of the own master station and the other master station has priority, so that the variable-length frames from the first master station and the variable-length frames from the second master station do not collide with each other in the optical fiber network, and
    a transmission section for retrieving the data stored in the queues to form variable-length frames, and transmitting the variable-length frames to the first slave station and the second slave station via the optical fiber network according to the transmission timing determined by the adjustment section,
    wherein the first master station and the second master station transmit (i) transmission timing information indicating determined transmission timing of variable-length frames in a first fixed-length frame to be transmitted, (ii) at least a part of transmission timing information indicating determined transmission timing of variable-length frames in a second fixed-length frame to be transmitted next to the first fixed-length frame, and (iii) transmission rate information for the variable-length frames to be transmitted at each determined transmission timing, to the first slave station and/or the second slave station, by adding them into a header of a first variable-length frame which the first master station transmits first in the first fixed-length frame and a header of a second variable-length frame which the second master station transmits first in the first fixed-length frame respectively, and
    wherein the first slave station and/or the second slave station acquire(s), according to the transmission timing information and the transmission rate information, the variable-length frames at the transmission timing in which the variable-length frames with the first transmission rate or the second transmission rate of the own slave station are received, among the variable-length frames input from the optical fiber network.

2. The passive optical network system according to claim 1, wherein the first master station and the second master station transmit, to the first slave station and/or the second slave station, the transmission timing information determined by the adjustment section, and slave station identification information representing a destination of the variable-length frame transmitted at each transmission timing, and
    wherein the first slave station and/or the second slave station acquire(s), according to the transmission timing and the transmission rate information, the variable-length frame at the timing when the slave station identification information represents the own slave station among the variable-length frames input from the optical fiber network.

3. The passive optical network system according to claim 1, wherein the adjustment section:
    sets the queue with nth priority of the first or the second master station previously defined to have priority by the priority instruction information to have an updated 2n−1th priority, where n is an integer equal to or larger than one;
    sets the queue with nth priority of the first or the second master station without priority to have an updated 2nth priority; and
    determines the transmission timing of the data stored in each queue of the first master station and in each queue of the second master station based on an updated priority.

4. The passive optical network system according to claim 1, wherein one of the first master station and second master station receives the transmission timing information determined by the other master station, verifies the transmission information determined by the adjustment section with received transmission timing information, adopts the transmission timing information if the transmission timing information for both are identical, and adopts the transmission timing information determined by the master station having priority based on the priority instruction information previously defined to the master stations if the transmission timing information for both are not identical.

5. The passive optical network system according to claim 1, wherein the first master station and the second master station transmit a plurality of variable-length frames as a burst signal having guard time between the variable-length frames.

6. The passive optical network system according to claim 1, wherein one of the first slave station and the second slave station includes:
- a switching control section in which either the first transmission rate or the second transmission rate is previously set, and which switches a transmission rate for receiving the variable-length frames to the first transmission rate or the second transmission rate according to a setting which is previously set, and
- a selector for acquiring the variable-length frames with the first transmission rate or the variable-length frames with the second transmission rate among the variable-length frames received from the first master station and the second master station, according to the transmission rate switched by the instruction of the switching control section.

7. An optical line terminator used in a passive optical network system including a plurality of optical line terminators communicating at different transmission rates, a first optical network unit for communicating with one of the optical line terminators at a first transmission rate, a second optical network unit for communicating with another of the optical line terminators at a second transmission rate and, an optical fiber network in which variable-length frames from the plurality of optical line terminators are time-division multiplexed via a first splitter, and multiplexed variable-length frames are transmitted to the first and second optical network units via a second splitter, the optical line terminator comprising:
- queues corresponding to a previously determined priority, and for storing data to be transmitted to one of the first optical network unit and the second optical network unit;
- a queue sorting watching section for obtaining priority information of the queues of the own optical line terminator, and obtaining priority information of the queues from another optical line terminator;
- an adjustment section for determining transmission timing of the variable-length frames transmitted from the plurality of optical line terminators based on the priority information of the queues of the own optical line terminator and the priority information of the queues of another optical line terminator, which are obtained by the queue sorting watching section, and priority instruction information of the optical line terminators previously defining which of the own optical line terminator and another optical line terminator has priority, so that the variable-length frames from the plurality of optical line terminators do not collide with each other in the optical fiber network; and
- a transmission section for retrieving the data stored in the queues to form the variable-length frames, and transmitting the variable-length frames to the first optical network unit and the second optical network unit via the optical fiber network according to the transmission timing determined by the adjustment section,
- wherein the optical line terminator transmits (i) transmission timing information indicating determined transmission timing of variable-length frames in a first fixed-length frame to be transmitted, (ii) at least a part of transmission timing information indicating determined transmission timing of variable-length frames in a second fixed-length frame to be transmitted next to the first fixed-length frame, and (iii) transmission rate information for the variable-length frames to be transmitted at each determined transmission timing, to the first optical network unit and/or the second optical network unit, by adding them into a header of a first variable-length frame to be transmitted first in the first fixed-length frame from the own optical line terminator.

8. A communication method between a plurality of master stations and a plurality of slave stations of a passive optical network system in which the plurality of master stations and the plurality of slave stations are connected with an optical fiber network including an optical splitter, the communication method comprising:
- sharing, by the plurality of master stations, priority information of a plurality of queues in each of the master stations;
- determining, by the plurality of master stations, transmission timing of a plurality of variable-length frames to the plurality of slave stations based on priority instruction information representing which of the master stations has priority and the priority information shared by the master stations;
- transmitting, by the plurality of master stations, (i) transmission timing information indicating determined transmission timing of variable-length frames in a first fixed-length frame to be transmitted, (ii) at least a part of transmission timing information indicating determined transmission timing of variable-length frames in a second fixed-length frame to be transmitted next to the first fixed-length frame, and (iii) transmission rate information for the variable-length frames to be transmitted at each determined transmission timing, to the plurality of slave stations, by adding them into a header of a first variable-length frame to be transmitted first in the first fixed-length frame from the own master station; and
- transmitting, by the plurality of master stations, the plurality of variable-length frames by adding the plurality of variable-length frames in a fixed-length frame as a burst signal having guard time between the variable-length frames according to the transmission timing.

9. The passive optical network system according to claim 1, wherein the transmission timing information for the variable-length frames in the second fixed-length frame, the transmission timing information being included in the first fixed-length frame, includes transmission timing of a third variable-length frame which the first master station transmits first in the second fixed-length frame, and transmission timing of a fourth variable-length frame which the second master station transmits first in the second fixed-length frame.

10. The optical line terminator according to claim 7, wherein the transmission timing information for the variable-length frames in the second fixed-length frame, the transmission timing information being included in the first fixed-length frame, indicates transmission timing of a variable-length frame which is to be transmitted first in the second fixed-length frame from the own optical line terminator.

11. The communication method according to claim 8, wherein the transmission timing information for the variable-length frames in the second fixed-length frame, the transmission timing information being included in the first fixed-length frame, indicates transmission timing of a variable-length frame which any of the master stations transmits first in the second fixed-length frame.

* * * * *